(12) United States Patent
Sandmann et al.

(10) Patent No.: US 11,763,448 B2
(45) Date of Patent: Sep. 19, 2023

(54) SYSTEM AND METHOD FOR PREPARING A PHARMACEUTICAL COMPOUND

(71) Applicant: Becton, Dickinson and Company, Franklin Lakes, NJ (US)

(72) Inventors: Christian Sandmann, Wayne, NJ (US); Matt Thomas, Philadelphia, PA (US); Chris Murray, Philadelphia, PA (US); Christian Hanke, Vienna (AT); Helmut Hoerner, Vienna (AT); Robert Tannen, Philadelphia, PA (US); Mathieu Turpault, Pennington, NJ (US); Erik Kurt Witt, Oakland, NJ (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 0 days.

(21) Appl. No.: 16/877,022

(22) Filed: May 18, 2020

(65) Prior Publication Data
US 2020/0279372 A1 Sep. 3, 2020

Related U.S. Application Data

(62) Division of application No. 14/847,508, filed on Sep. 8, 2015, now Pat. No. 10,692,207.
(Continued)

(51) Int. Cl.
*H04N 5/225* (2006.01)
*G06T 7/00* (2017.01)
(Continued)

(52) U.S. Cl.
CPC ........... *G06T 7/0012* (2013.01); *G01G 21/28* (2013.01); *G05B 19/4155* (2013.01);
(Continued)

(58) Field of Classification Search
CPC . G06T 7/0012; G06F 3/04817; G06F 3/0482; G06F 3/04842; H04N 5/225; H04N 5/2252
See application file for complete search history.

(56) References Cited

U.S. PATENT DOCUMENTS

| 3,453,422 A | 7/1969 | Susor |
| 3,551,353 A | 12/1970 | Chen et al. |
| (Continued) | | |

FOREIGN PATENT DOCUMENTS

| CA | 2477259 A1 | 9/2003 |
| CN | 1328445 A | 12/2001 |
| (Continued) | | |

OTHER PUBLICATIONS

Scheraga, "Tech firms answer chain pharmacy's call for productivity", Drug Store News, 2003, pp. 31-32.
(Continued)

*Primary Examiner* — Jonathan R Messmore
(74) *Attorney, Agent, or Firm* — The Webb Law Firm

(57) ABSTRACT

A system for preparing a pharmaceutical compound comprises: a computing device comprising a user interface providing an operator with instructions for preparing the pharmaceutical compound and at least one processor operatively connected to the user interface; a scale operatively connected to the at least one processor; and an image capture device operatively connected to the at least one processor and the scale and positioned to capture an image of at least one of a component used in preparing the pharmaceutical compound and the pharmaceutical compound.

22 Claims, 15 Drawing Sheets

Related U.S. Application Data

(60) Provisional application No. 62/078,067, filed on Nov. 11, 2014, provisional application No. 62/077,968, filed on Nov. 11, 2014, provisional application No. 62/072,160, filed on Oct. 29, 2014, provisional application No. 62/072,054, filed on Oct. 29, 2014, provisional application No. 62/047,325, filed on Sep. 8, 2014.

(51) Int. Cl.

| | | |
|---|---|---|
| *G01G 21/28* | (2006.01) | |
| *G06V 20/80* | (2022.01) | |
| *H04N 23/00* | (2023.01) | |
| *H04N 23/51* | (2023.01) | |
| *H04N 23/56* | (2023.01) | |
| *H04N 23/80* | (2023.01) | |
| *G05B 19/4155* | (2006.01) | |
| *G06F 3/04817* | (2022.01) | |
| *G06F 3/0482* | (2013.01) | |
| *G06F 3/04842* | (2022.01) | |
| *G01G 19/00* | (2006.01) | |

(52) U.S. Cl.
CPC ........ *G06F 3/0482* (2013.01); *G06F 3/04817* (2013.01); *G06F 3/04842* (2013.01); *G06V 20/80* (2022.01); *H04N 23/00* (2023.01); *H04N 23/51* (2023.01); *H04N 23/56* (2023.01); *H04N 23/80* (2023.01); *G01G 19/00* (2013.01); *G05B 2219/31313* (2013.01); *G05B 2219/35113* (2013.01); *G06T 2207/10004* (2013.01)

(56) References Cited

U.S. PATENT DOCUMENTS

| | | |
|---|---|---|
| 3,584,204 A | 6/1971 | Susor |
| 3,587,856 A | 6/1971 | Lemelson |
| 3,627,423 A | 12/1971 | Knapp |
| 3,734,286 A | 5/1973 | Simjian |
| 3,914,058 A | 10/1975 | Knapp et al. |
| 3,965,340 A | 6/1976 | Renner et al. |
| 3,966,332 A | 6/1976 | Knapp et al. |
| 3,970,643 A | 7/1976 | Kee Woo et al. |
| 4,017,157 A | 4/1977 | van Riet |
| 4,063,823 A | 12/1977 | Grat |
| 4,087,184 A | 5/1978 | Knapp et al. |
| 4,165,633 A | 8/1979 | Raisanen |
| 4,273,816 A | 6/1981 | Tollette |
| 4,277,089 A | 7/1981 | Lockhart |
| 4,469,146 A | 9/1984 | Campbell et al. |
| 4,476,381 A | 10/1984 | Rubin |
| 4,549,205 A | 10/1985 | Misaki et al. |
| 4,628,193 A | 12/1986 | Blum |
| 4,653,010 A | 3/1987 | Figler et al. |
| 4,655,026 A | 4/1987 | Wigoda |
| 4,676,650 A | 6/1987 | Bjorndal et al. |
| 4,676,776 A | 6/1987 | Howson |
| 4,695,954 A | 9/1987 | Rose et al. |
| 4,733,363 A | 3/1988 | Yamada et al. |
| 4,790,118 A | 12/1988 | Chilcoate |
| 4,804,273 A | 2/1989 | Tondello et al. |
| 4,810,243 A | 3/1989 | Howson |
| 4,829,650 A | 5/1989 | Galard |
| 4,835,372 A | 5/1989 | Gombrich et al. |
| 4,839,675 A | 6/1989 | Owen |
| 4,847,764 A | 7/1989 | Halvorson |
| 4,853,521 A | 8/1989 | Claeys et al. |
| 4,857,716 A | 8/1989 | Gombrich et al. |
| 4,860,899 A | 8/1989 | McKee |
| 4,874,764 A | 10/1989 | Ueda et al. |
| 4,879,650 A | 11/1989 | Kurimoto et al. |
| 4,918,604 A | 4/1990 | Baum |
| 4,972,657 A | 11/1990 | McKee |
| 5,031,642 A | 7/1991 | Nosek |
| 5,038,839 A | 8/1991 | Morimoto et al. |
| 5,072,798 A | 12/1991 | Franklin |
| 5,084,832 A | 1/1992 | Yamada et al. |
| 5,088,981 A | 2/1992 | Howson et al. |
| 5,094,786 A | 3/1992 | Nagashima et al. |
| 5,153,827 A | 10/1992 | Coutre et al. |
| 5,182,707 A | 1/1993 | Cooper et al. |
| 5,184,753 A | 2/1993 | Horak |
| 5,260,880 A | 11/1993 | Tump |
| 5,261,546 A | 11/1993 | van der Grift |
| 5,272,318 A | 12/1993 | Rousso et al. |
| 5,308,930 A | 5/1994 | Tokutu et al. |
| 5,317,506 A | 5/1994 | Coutre et al. |
| 5,328,208 A | 7/1994 | Garrison |
| 5,337,919 A | 8/1994 | Spaulding et al. |
| 5,341,077 A | 8/1994 | Chen et al. |
| 5,341,854 A | 8/1994 | Zezulka et al. |
| 5,344,043 A | 9/1994 | Moulding et al. |
| 5,348,061 A | 9/1994 | Riley et al. |
| 5,365,343 A | 11/1994 | Knapp |
| 5,390,796 A | 2/1995 | Kerfoot, Jr. |
| 5,395,174 A | 3/1995 | Koch et al. |
| 5,401,059 A | 3/1995 | Ferrario |
| 5,404,227 A | 4/1995 | Sumita et al. |
| 5,405,048 A | 4/1995 | Rogers et al. |
| 5,416,706 A | 5/1995 | Hagenbuch |
| 5,442,146 A | 8/1995 | Bell et al. |
| 5,444,480 A | 8/1995 | Sumita |
| 5,444,539 A | 8/1995 | van der Grift |
| 5,468,110 A | 11/1995 | McDonald et al. |
| 5,480,062 A | 1/1996 | Rogers et al. |
| 5,502,944 A | 4/1996 | Kraft et al. |
| 5,508,499 A | 4/1996 | Ferrario |
| 5,516,475 A | 5/1996 | Wilson |
| 5,523,560 A | 6/1996 | Manique et al. |
| 5,568,262 A | 10/1996 | LaChapelle et al. |
| 5,583,948 A | 12/1996 | Shibayama |
| 5,593,267 A | 1/1997 | McDonald et al. |
| 5,597,995 A | 1/1997 | Williams et al. |
| 5,601,314 A | 2/1997 | Burns et al. |
| 5,643,212 A | 7/1997 | Coutre et al. |
| 5,651,775 A | 7/1997 | Walker et al. |
| 5,713,485 A | 2/1998 | Liff et al. |
| 5,719,679 A | 2/1998 | Shimizu et al. |
| 5,720,154 A | 2/1998 | Lasher et al. |
| 5,721,433 A | 2/1998 | Kosaka |
| 5,747,744 A | 5/1998 | Kraft et al. |
| 5,753,868 A | 5/1998 | Diem |
| 5,758,095 A | 5/1998 | Albaum et al. |
| 5,781,442 A | 7/1998 | Engleson et al. |
| 5,797,515 A | 8/1998 | Liff et al. |
| 5,833,866 A | 11/1998 | Brown |
| 5,841,077 A | 11/1998 | Kolaci |
| 5,841,541 A | 11/1998 | Dlugos |
| 5,907,493 A | 5/1999 | Boyer et al. |
| 5,940,176 A | 8/1999 | Knapp |
| 5,963,136 A | 10/1999 | O'Brien |
| 5,966,457 A | 10/1999 | Lemelson |
| 5,969,317 A | 10/1999 | Espy et al. |
| 5,979,512 A | 11/1999 | McGregor et al. |
| 5,990,422 A | 11/1999 | Komori et al. |
| 6,000,828 A | 12/1999 | Leet |
| 6,005,959 A | 12/1999 | Mohan et al. |
| 6,006,828 A | 12/1999 | Kluth et al. |
| 6,068,156 A | 5/2000 | Liff et al. |
| 6,113,578 A | 9/2000 | Brown |
| 6,181,982 B1 | 1/2001 | Yuyama et al. |
| 6,202,923 B1 | 3/2001 | Boyer et al. |
| 6,234,964 B1 | 5/2001 | Iliff |
| 6,330,491 B1 | 12/2001 | Lion |
| 6,347,486 B1 | 2/2002 | Badillet |
| 6,364,517 B1 | 4/2002 | Yuyama et al. |
| 6,384,348 B1 | 5/2002 | Haga et al. |
| 6,438,451 B1 | 8/2002 | Lion |
| 6,466,879 B1 | 10/2002 | Cantu et al. |
| 6,473,169 B1 | 10/2002 | Dawley et al. |
| 6,478,147 B1 | 11/2002 | Brander et al. |

(56) References Cited

U.S. PATENT DOCUMENTS

| | | |
|---|---|---|
| 6,535,637 B1 | 3/2003 | Wootton et al. |
| 6,542,902 B2 | 4/2003 | Dulong et al. |
| 6,551,391 B1 | 4/2003 | Gerhardt et al. |
| 6,564,121 B1 | 5/2003 | Wallace et al. |
| 6,574,580 B2 | 6/2003 | Hamilton |
| 6,581,798 B2 | 6/2003 | Liff et al. |
| 6,605,784 B2 | 8/2003 | Eigenmann et al. |
| 6,694,334 B2 | 2/2004 | DuLong et al. |
| 6,711,460 B1 | 3/2004 | Reese |
| 6,731,324 B2 | 5/2004 | Levy |
| 6,738,723 B2 | 5/2004 | Hamilton |
| 6,771,369 B2 | 8/2004 | Rzasa et al. |
| 6,775,602 B2 | 8/2004 | Gordon, Jr. et al. |
| 6,781,689 B2 | 8/2004 | Chiba |
| 6,810,355 B1 | 10/2004 | Kreidler et al. |
| 6,813,473 B1 | 11/2004 | Bruker |
| 6,814,255 B2 | 11/2004 | Leff et al. |
| 6,816,625 B2 | 11/2004 | Lewis, Jr. et al. |
| 6,873,725 B2 | 3/2005 | Xu |
| 6,877,530 B2 | 4/2005 | Osborne et al. |
| 6,915,823 B2 | 7/2005 | Osborne et al. |
| 6,920,094 B2 | 7/2005 | Komaki |
| 6,922,652 B2 | 7/2005 | Edwards et al. |
| 6,937,339 B2 | 8/2005 | Yamazaki et al. |
| 6,970,094 B2 | 11/2005 | Yamashita et al. |
| 6,975,924 B2 | 12/2005 | Kircher et al. |
| 6,990,463 B2 | 1/2006 | Walter et al. |
| 6,995,664 B1 | 2/2006 | Darling |
| 6,998,542 B2 | 2/2006 | Wallisch |
| 7,006,893 B2 | 2/2006 | Hart et al. |
| 7,015,806 B2 | 3/2006 | Naidoo et al. |
| 7,017,622 B2 | 3/2006 | Osborne et al. |
| 7,017,623 B2 | 3/2006 | Tribble et al. |
| 7,028,723 B1 | 4/2006 | Alouani et al. |
| 7,070,097 B2 | 7/2006 | Blanford et al. |
| 7,096,212 B2 | 8/2006 | Tribble et al. |
| 7,107,106 B2 | 9/2006 | Engelson et al. |
| 7,117,902 B2 | 10/2006 | Osborne |
| 7,128,105 B2 | 10/2006 | Tribble et al. |
| 7,155,396 B2 | 12/2006 | Yuyama et al. |
| 7,163,035 B2 | 1/2007 | Khan et al. |
| 7,173,197 B1 | 2/2007 | Kasperek |
| 7,194,336 B2 | 3/2007 | DiGianfilippo et al. |
| 7,209,891 B1 | 4/2007 | Addy et al. |
| 7,230,529 B2 | 6/2007 | Ketcherside, Jr. et al. |
| 7,240,699 B2 | 7/2007 | Osborne et al. |
| 7,262,847 B2 | 8/2007 | Goodall et al. |
| 7,286,997 B2 | 10/2007 | Spector et al. |
| 7,297,108 B2 | 11/2007 | Iliff |
| 7,310,143 B2 | 12/2007 | Budd |
| 7,317,967 B2 | 1/2008 | DiGianfilippo et al. |
| 7,343,224 B2 | 3/2008 | DiGianfilippo et al. |
| 7,343,943 B2 | 3/2008 | Khan et al. |
| 7,357,045 B2 | 4/2008 | Rasmussen et al. |
| 7,363,115 B2 | 4/2008 | Anderson et al. |
| 7,375,294 B2 | 5/2008 | Kraft |
| 7,376,934 B2 | 5/2008 | Steinrisser et al. |
| 7,391,515 B2 | 6/2008 | Budd et al. |
| 7,427,002 B2 | 9/2008 | Liff et al. |
| 7,457,685 B2 | 11/2008 | D'Silva |
| 7,478,513 B2 | 1/2009 | Baldwin |
| 7,493,263 B2 | 2/2009 | Helmus et al. |
| 7,499,581 B2 | 3/2009 | Tribble et al. |
| 7,530,497 B2 | 5/2009 | Knowles et al. |
| 7,536,843 B2 | 5/2009 | Djurle et al. |
| 7,554,042 B2 | 6/2009 | Gregerson et al. |
| 7,555,557 B2 | 6/2009 | Bradley et al. |
| 7,560,720 B2 | 7/2009 | Voigt et al. |
| 7,581,953 B2 | 9/2009 | Lehmann et al. |
| 7,592,553 B2 | 9/2009 | Yuyama et al. |
| 7,597,247 B2 | 10/2009 | Helmin et al. |
| 7,599,516 B2 | 10/2009 | Limer et al. |
| 7,610,115 B2 | 10/2009 | Rob et al. |
| 7,620,479 B2 | 11/2009 | Kircher et al. |
| 7,620,563 B2 | 11/2009 | Tornaquindici |
| 7,620,568 B1 | 11/2009 | Parker-Malchak |
| 7,631,475 B2 | 12/2009 | Baldwin et al. |
| 7,633,018 B2 | 12/2009 | Leisinger et al. |
| 7,636,718 B1 | 12/2009 | Steen et al. |
| 7,643,134 B2 | 1/2010 | Berndt |
| 7,651,664 B2 | 1/2010 | Appoldt et al. |
| 7,681,606 B2 | 3/2010 | Khan et al. |
| 7,698,019 B2 | 4/2010 | Moncrief et al. |
| 7,706,915 B2 | 4/2010 | Mohapatra et al. |
| 7,734,478 B2 | 6/2010 | Goodall et al. |
| 7,753,085 B2 | 7/2010 | Tribble et al. |
| 7,765,108 B2 | 7/2010 | Goodall et al. |
| 7,769,221 B1 | 8/2010 | Shakes et al. |
| 7,771,659 B2 | 8/2010 | Ziegler |
| 7,801,642 B2 | 9/2010 | Ansari et al. |
| 7,814,731 B2 | 10/2010 | Bender et al. |
| 7,831,393 B2 | 11/2010 | Savva |
| 7,831,447 B2 | 11/2010 | Schuman |
| 7,837,103 B2 | 11/2010 | Suto |
| 7,845,551 B2 | 12/2010 | Helmin et al. |
| 7,847,970 B1 | 12/2010 | McGrady |
| 7,860,583 B2 | 12/2010 | Condurso et al. |
| 7,860,730 B1 | 12/2010 | Goodall et al. |
| 7,861,495 B2 | 1/2011 | Yuyama et al. |
| 7,873,435 B2 | 1/2011 | Yuyama et al. |
| 7,886,230 B2 | 2/2011 | Monnier et al. |
| 7,900,658 B2 | 3/2011 | Osborne et al. |
| 7,913,475 B2 | 3/2011 | Khan et al. |
| 7,913,720 B2 | 3/2011 | Tribble et al. |
| 7,917,329 B2 | 3/2011 | Hamamoto |
| 7,927,313 B2 | 4/2011 | Stewart et al. |
| 7,930,064 B2 | 4/2011 | Popovich, Jr. et al. |
| 7,930,066 B2 | 4/2011 | Eliuk et al. |
| 7,930,364 B2 | 4/2011 | Ramaswamy et al. |
| 7,937,290 B2 | 5/2011 | Bahir |
| 7,938,032 B2 | 5/2011 | Fernando |
| 7,941,915 B2 | 5/2011 | Yuyama et al. |
| 7,956,894 B2 | 6/2011 | Akers et al. |
| 7,964,805 B2 | 6/2011 | Yuyama et al. |
| 7,991,627 B2 | 8/2011 | Hutchinson et al. |
| 7,995,831 B2 | 8/2011 | Eller et al. |
| 3,024,913 A1 | 9/2011 | Khan et al. |
| 8,037,659 B2 | 10/2011 | Osborne et al. |
| 8,041,102 B2 | 10/2011 | Yuyama et al. |
| 8,073,238 B2 | 12/2011 | Nakanishi et al. |
| 8,140,349 B2 | 3/2012 | Hanson et al. |
| 8,140,351 B2 | 3/2012 | Tribble et al. |
| 8,140,395 B2 | 3/2012 | Murphy et al. |
| 8,151,835 B2 | 4/2012 | Khan et al. |
| 8,191,339 B2 | 6/2012 | Tribble et al. |
| 8,194,129 B2 | 6/2012 | Jones et al. |
| 8,209,941 B2 | 7/2012 | Osborne et al. |
| 8,219,413 B2 | 7/2012 | Martinez et al. |
| 8,220,503 B2 | 7/2012 | Tribble et al. |
| 8,224,483 B1 | 7/2012 | Ansari et al. |
| 8,229,763 B2 | 7/2012 | Laughland et al. |
| 8,234,128 B2 | 7/2012 | Martucci et al. |
| 8,266,878 B2 | 9/2012 | Luciano, Jr. et al. |
| 8,280,549 B2 | 10/2012 | Liff et al. |
| 8,284,305 B2 | 10/2012 | Newcomb et al. |
| 8,295,582 B2 | 10/2012 | Eller et al. |
| 8,301,410 B2 | 10/2012 | Chu et al. |
| 8,328,082 B1 | 12/2012 | Bochenko et al. |
| 8,345,989 B1 | 1/2013 | Bresolin et al. |
| 8,353,318 B2 | 1/2013 | Ranalletta et al. |
| 8,374,887 B1 | 2/2013 | Alexander |
| 8,374,965 B2 | 2/2013 | Friend et al. |
| 8,396,722 B2 | 3/2013 | Tanimoto et al. |
| 8,417,539 B2 | 4/2013 | Chapman et al. |
| 8,433,129 B2 | 4/2013 | Nakanishi et al. |
| 8,442,298 B2 | 5/2013 | Nakanishi et al. |
| 8,448,846 B2 | 5/2013 | Needhan et al. |
| 8,463,622 B2 | 6/2013 | Garms et al. |
| 8,477,989 B2 | 7/2013 | Bresolin |
| 8,489,425 B2 | 7/2013 | Moncrief et al. |
| 8,551,421 B2 | 10/2013 | Luchinger |
| 8,554,579 B2 | 10/2013 | Tribble et al. |
| 8,571,297 B2 | 10/2013 | Eller et al. |
| 8,571,881 B2 | 10/2013 | Rousso et al. |

(56) References Cited

U.S. PATENT DOCUMENTS

| | | |
|---|---|---|
| 8,571,886 B2 | 10/2013 | Chudy et al. |
| 8,678,047 B2 | 3/2014 | Tribble et al. |
| 8,682,047 B2 | 3/2014 | Lang et al. |
| 8,706,522 B2 | 4/2014 | Cohan et al. |
| 8,740,077 B2 | 6/2014 | Needham et al. |
| 8,763,651 B2 | 7/2014 | Stavsky et al. |
| 8,775,198 B2 | 7/2014 | Wiener et al. |
| 8,818,821 B2 | 8/2014 | Fioravanti |
| 8,861,816 B2 | 10/2014 | Lang et al. |
| 8,869,297 B2 | 10/2014 | Hanov et al. |
| 8,881,980 B2 | 11/2014 | Magill |
| 8,908,163 B2 | 12/2014 | Young et al. |
| 8,958,112 B2 | 2/2015 | Matsui et al. |
| 8,989,895 B2 | 3/2015 | Holman et al. |
| 9,053,616 B2 | 6/2015 | Grabiner et al. |
| 9,121,751 B2 | 9/2015 | Michael |
| 9,138,693 B2 | 9/2015 | Aouad |
| 9,240,044 B2 | 1/2016 | Okuda et al. |
| 9,922,171 B2 * | 3/2018 | Mahar ............ G07F 9/026 |
| 2001/0048027 A1 | 12/2001 | Walsh |
| 2002/0035412 A1 | 3/2002 | Kircher et al. |
| 2002/0057339 A1 | 5/2002 | Shoenfeld |
| 2002/0067411 A1 | 6/2002 | Thompson et al. |
| 2002/0100762 A1 | 8/2002 | Liff et al. |
| 2002/0139394 A1 | 10/2002 | Bronson |
| 2002/0145042 A1 | 10/2002 | Knowles et al. |
| 2003/0050731 A1 | 3/2003 | Rosenblum |
| 2003/0050802 A1 | 3/2003 | Jay et al. |
| 2003/0066525 A1 | 4/2003 | Lewis et al. |
| 2003/0073349 A1 | 4/2003 | Nagao et al. |
| 2003/0074223 A1 | 4/2003 | Hickle et al. |
| 2003/0078849 A1 | 4/2003 | Snyder |
| 2003/0105555 A1 | 6/2003 | Lunak et al. |
| 2003/0107654 A1 | 6/2003 | Ohmura |
| 2003/0136590 A1 | 7/2003 | Gluvakov |
| 2003/0139701 A1 | 7/2003 | White et al. |
| 2003/0140928 A1 | 7/2003 | Bui et al. |
| 2003/0144878 A1 | 7/2003 | Wilkes et al. |
| 2003/0158508 A1 | 8/2003 | DiGianfilippo et al. |
| 2003/0179287 A1 | 9/2003 | Kozic et al. |
| 2003/0204357 A1 | 10/2003 | Hamilton |
| 2004/0017475 A1 | 1/2004 | Akers et al. |
| 2004/0076318 A1 | 4/2004 | Faeldt et al. |
| 2004/0143459 A1 | 7/2004 | Engleson et al. |
| 2004/0150815 A1 | 8/2004 | Sones et al. |
| 2004/0172289 A1 | 9/2004 | Kozic et al. |
| 2004/0193454 A1 | 9/2004 | Foote et al. |
| 2004/0204954 A1 | 10/2004 | Lacko |
| 2004/0225528 A1 | 11/2004 | Brock |
| 2005/0037485 A1 | 2/2005 | Rodgers et al. |
| 2005/0080651 A1 | 4/2005 | Morrison et al. |
| 2005/0086008 A1 | 4/2005 | DiGianfilippo et al. |
| 2005/0130173 A1 | 6/2005 | Leamon et al. |
| 2005/0197930 A1 | 9/2005 | Polarine |
| 2006/0080041 A1 | 4/2006 | Anderson et al. |
| 2006/0080177 A1 | 4/2006 | Walter et al. |
| 2006/0106647 A1 | 5/2006 | Brummel et al. |
| 2006/0136260 A1 | 6/2006 | Ash et al. |
| 2006/0136261 A1 | 6/2006 | Ash et al. |
| 2006/0136268 A1 | 6/2006 | Ash et al. |
| 2006/0173714 A1 | 8/2006 | Grotzinger, Jr. |
| 2006/0200369 A1 | 9/2006 | Batch et al. |
| 2006/0238346 A1 * | 10/2006 | Teller ............ G01G 23/3735 340/572.1 |
| 2006/0287884 A1 | 12/2006 | Sandy et al. |
| 2007/0021929 A1 | 1/2007 | Lemo et al. |
| 2007/0043473 A1 | 2/2007 | Anderson et al. |
| 2007/0106425 A1 | 5/2007 | Anderson et al. |
| 2007/0156707 A1 | 7/2007 | Fuchs et al. |
| 2007/0162295 A1 | 7/2007 | Akhtar et al. |
| 2007/0189597 A1 | 8/2007 | Limer et al. |
| 2007/0228172 A1 | 10/2007 | Knowles et al. |
| 2007/0239482 A1 | 10/2007 | Finn et al. |
| 2008/0045811 A1 | 2/2008 | Iliff |
| 2008/0047760 A1 | 2/2008 | Georgitsis |
| 2008/0052120 A1 | 2/2008 | Iliff |
| 2008/0052121 A1 | 2/2008 | Iliff |
| 2008/0052122 A1 | 2/2008 | Iliff |
| 2008/0052123 A1 | 2/2008 | Iliff |
| 2008/0052130 A1 | 2/2008 | Iliff |
| 2008/0052132 A1 | 2/2008 | Iliff |
| 2008/0086326 A1 | 4/2008 | Moura et al. |
| 2008/0105468 A1 | 5/2008 | Ragazzini et al. |
| 2008/0125897 A1 | 5/2008 | DiGianfilippo et al. |
| 2008/0195416 A1 | 8/2008 | Tribble et al. |
| 2008/0312861 A1 | 12/2008 | Casto et al. |
| 2009/0110019 A1 | 4/2009 | Houde-Walter et al. |
| 2009/0154764 A1 | 6/2009 | Khan et al. |
| 2009/0154789 A1 | 6/2009 | Wolfe |
| 2009/0202108 A1 | 8/2009 | Faeldt et al. |
| 2009/0265185 A1 | 10/2009 | Finn et al. |
| 2009/0323108 A1 | 12/2009 | Shimma |
| 2009/0326861 A1 | 12/2009 | Langford et al. |
| 2010/0057264 A1 | 3/2010 | Kircher et al. |
| 2010/0324936 A1 | 12/2010 | Vishnubhatla et al. |
| 2011/0029445 A1 | 2/2011 | Whittacre et al. |
| 2011/0031038 A1 | 2/2011 | Page |
| 2011/0073656 A1 | 3/2011 | Detwiler et al. |
| 2011/0184751 A1 | 7/2011 | Holmes |
| 2011/0202366 A1 | 8/2011 | Akers et al. |
| 2011/0234977 A1 | 9/2011 | Verdooner |
| 2011/0267465 A1 | 11/2011 | Alexander et al. |
| 2011/0307270 A1 | 12/2011 | Berkelhamer et al. |
| 2012/0010840 A1 | 1/2012 | Fankhauser et al. |
| 2012/0041778 A1 | 2/2012 | Kraft |
| 2012/0065987 A1 | 3/2012 | Farooq et al. |
| 2012/0070480 A1 | 3/2012 | Amos et al. |
| 2012/0330684 A1 | 12/2012 | Jacobs et al. |
| 2013/0018356 A1 | 1/2013 | Prince et al. |
| 2013/0054256 A1 | 2/2013 | Holman et al. |
| 2013/0172863 A1 | 7/2013 | Hakomori et al. |
| 2013/0194414 A1 | 8/2013 | Poirier et al. |
| 2013/0271796 A1 * | 10/2013 | Landa ............ H04N 1/4072 358/463 |
| 2013/0342676 A1 | 12/2013 | Amano et al. |
| 2014/0022569 A1 * | 1/2014 | Matsui ............ G16H 20/10 358/1.6 |
| 2014/0025206 A1 | 1/2014 | Matsui et al. |
| 2014/0157169 A1 | 6/2014 | Kikin-gil |
| 2015/0272320 A1 | 10/2015 | Ranalletta et al. |

FOREIGN PATENT DOCUMENTS

| | | |
|---|---|---|
| CN | 201946048 U | 8/2011 |
| CN | 103118712 A | 5/2013 |
| EP | 1803431 A1 | 7/2007 |
| GB | 2379037 A | 2/2003 |
| JP | 2005211541 A | 8/2005 |
| JP | 2013-144101 A | 7/2013 |
| JP | 3186063 U | 9/2013 |
| JP | 2013238493 A | 11/2013 |
| JP | 201436791 A | 2/2014 |
| WO | 8700659 A1 | 1/1987 |
| WO | 03040980 A1 | 5/2003 |
| WO | 2006095850 A1 | 9/2006 |
| WO | 2008062485 A1 | 5/2008 |
| WO | 2012008393 A1 | 1/2012 |
| WO | 2012095279 A2 | 7/2012 |
| WO | 2014065872 A1 | 5/2014 |

OTHER PUBLICATIONS

ScriptPro, SP 200 with Collating Control Center Robotic Prescription Dispensing System, Available online as of Feb. 2004.

ScriptPro, SP 200 Robotic Prescription Dispensing System, Available online as of Feb. 2004.

ScriptPro, SP Automation Center 200TM (Space 200TM) Prescription Dispensing Automation Center, Available online as of Feb. 2004.

Seifert et al., "The Training of a Telepharmacist: Addressing the Needs of Rural West Texas", American Journal of Pharmaceutical Education, 2004, pp. 1-9, vol. 68, No. 3.

(56) References Cited

OTHER PUBLICATIONS

Texas Administrative Code, Title 22, Examining Boards.
Tracy et al., Telemedicine Technical Assistance Documents "A Guide to Getting Started in Telemedicine", 2004, University of Missouri—School of Medicine, pp. 206-240.
Ukens, "Pharmacist shortage boosts telepharmacy", Drug Topics, 2002, p. 53, vol. 146, No. 11.
United States Pharmacopeia, Chapter 797, The National Formulary, 2004, United States Pharmacopeial Convention, Inc., Rockville, MD.
Wills, "Drug Images and Drug Imprints: Delivering Tools for Accuracy in Your Pharmacy", Insights, 2004, p. 7.
Woodall, "Remote Order Entry and Video Verifications: Reducing After-Hours Medication Error in a Rural Hospital", Joint Commission Journal on Quality and Safety, 2004, pp. 442-447, vol. 30, No. 8.
Yahoo Mail, Oct. 1, 2002, pp. 1-3.
Young, "Loan repayments help pharmacists provide care in medically underserved areas", American Journal Health—System Pharmacy, 2003, pp. 2186-2188, vol. 60.
Alexander, U.S. Appl. No. 11/056,511, filed Feb. 11, 2005.
Alexander, Office Action from U.S. Appl. No. 11/056,511, dated Apr. 8, 2008, pp. 1-12.
Alexander, Office Action from U.S. Appl. No. 11/056,511, dated Oct. 16, 2008, pp. 1-17.
Alexander, Office Action from U.S. Appl. No. 11/056,511, dated Apr. 13, 2009, pp. 1-14.
Alexander, Office Action from U.S. Appl. No. 11/056,511, dated Feb. 3, 2010, pp. 1-15.
Alexander, U.S. Appl. No. 13/097,575, filed Apr. 29, 2011.
Alexander, Notice of Allowance from U.S. Appl. No. 11/056,511, dated Dec. 24, 2012, pp. 1-16.
Anderson, "A Narrative on the History of the Development of Telepharmacy in North Dakota From the Board of Pharmacy's Perspective Recorded by Excerpts from Board Minutes", North Dakota State Board of Pharmacy, 2006, pp. 1-5.
Angaran, "Telemedicine and telepharmacy: Current status and future implications", American Journal of Health—System Pharmacy, 1999, pp. 1405-1426, vol. 56, No. 14.
Anonymous, "Pharmacy Annual Report-Chains covet customized pharmacy integration", Drug Store News, 2003, pp. 73-75, vol. 25, No. 10.
Bynum et al., "The Effect of Telepharmacy Counseling on Metered-Dose Inhaler Technique among Adolescents with Asthma in Rural Arkansas", Telemedicine Journal and e-Health, 2001, pp. 207-218, vol. 7, No. 3.
Cabral, Jr. et al., "Multimedia Systems for Telemedicine and Their Communications Requirements", IEEE Communications Magazine, 1996, pp. 20-27.
Cardinal Health Pharmacy Resources, "Improving after-hour pharmacy services for a community hospital by a remote pharmacy", 2003, Cardinal Health Inc., Houston Texas.
Casey et al., "Access to Rural Pharmacy Services In Minnesota, North Dakota, and South Dakota", University of Minnesota Rural Health Research Center—Working Paper 36, 2001, pp. 1-76.
Casey et al., "Pharmacist Staffing and the Use of Technology in Small Rural Hospital: Implications for Medication Safety", Upper Midwest Rural Health Research Center, 2005, pp. 1-43.
Clifton et al., "Provision of pharmacy services to underserved populations via remote dispensing and two-way videoconferencing". Am. J. Health-Syst. Pharm, 2003, pp. 2577-2582, vol. 60.
Dakota Legislative Assembly, "Article 61-07 Hospital Pharmacy", Apr. 1, 1988.
Dakota Legislative Assembly, "Article 61-02-08-08 Telepharmacy in Hospitals", Dec. 1, 2003.
Dart, "Telepharmacy project offers a dose of technology", North Dakota Living, 2003, pp. 10-11.
Dart, "Digital Doses-Telepharmacies save people in small towns and rural areas from having to drive hundreds of miles to fill a prescription", Rural Electric, 2005, pp. 28-31.

ExactaMix, "Compounding Solutions: An advanced system for multi-ingredient solution compounding", 2016, Baxter International Inc., Illinois, pp. 1-12.
Felkey, "Tools for Interactive Telepharmacy", Computer Talk, 2001, pp. 43-45.
Felkey, "Integrating Technology . . . at the Point of Care", Insight, 2004, pp. 8-10.
First Consulting Group, "Regulatory Compliance News Summary now includes global pharmaceutical regulatory news", 2004, pp. 1-7.
Frady, "What's New in RxCare Plus 17.2", Insight, 2001, p. 14.
Ghent, "Pharmacists to digital to fight shortage", Pharmacy Practice, 2004, pp. 47-48, vol. 20, No. 11.
Halversoan, "Innovative Healthcare Information Technology Solutions for Rural Americans", Rural Wisconsin Health Cooperative, 2001, pp. 1-49.
Hix, "Outpatient Pharmacies "Booming": An Inside Look at the Growth of an Industry", Insight, 2004, pp. 14-17.
Horns, "cytostatic programs", Pharmweb Internet Posting by Hank & Horns Software, Jan. 1999, pp. 1-3.
Kastango et al., "USP chapter 797: Establishing a practice standard for compounding sterile preparations in pharmacy", American Journal Health-System Pharmacy, 2004, pp. 1928-1938, vol. 61.
Keeys et al., "Providing nighttime pharmaceutical services through telepharmacy", American Journal Health—System Pharmacy, 2002, pp. 716-721, vol. 59.
Kosub, "Device allows pharmacy care in remote areas", Pharmacy Practice, 2004, pp. 12-13, vol. 20, No. 10.
Koutnik, "The Pharmacy of Tomorrow", Pharmacy Times, 2003, 3 pages.
Langham, "Taking Automation to New Levels", Insight, 2002, pp. 4-5.
Lustig, "Medication error prevention by pharmacists—An Israeli solution", Pharmacy World & Science, 2002, pp. 21-25, vol. 22, No. 1.
MacInnis et al., "Environmental Scan of Pharmacy Technicians", 2001, Canadian Pharmacists Association, Ottawa, ON, pp. 1-16.
Morris, et al. "National survey of quality assurance activities for pharmacy-compounded sterile preparations", American Journal Health—System Pharmacy, 2003, pp. 2567-2576, vol. 601.
Muller, "Electronic Prescribing What You Need to Know!", Insight, 2002, pp. 10-12.
Muller, "Make Your Next Move QS/1's Premium Pharmacy ", Insight, 2003, pp. 13-15.
Napoli et al., "Picture archiving and communication in radiology", Rays, 2003, vol. 28, No. 1, Abstract Only.
Nissen et al., "Can telepharmacy provide pharmacy services in the bush?", Journal of Telemedicine and Telecare, 2003, pp. 39-41, vol. 9, Supplement 2.
North Dakota State Board of Pharmacy Practice Act 2003.
Parks, "Using central-fill to maximize dispensing", Drug Store News, 2001, pp. 51, 75, vol. 23, No. 11.
Parks, "ATM-Style Drug Dispensers Taking Hold In Areas With Limited Pharmacist Services", Pharmacy Practice News, 2004, 6 pages, vol. 31, No. 01.
Peterson, "The North Dakota Telepharmacy Project: Restoring and Retaining Pharmacy Services in Rural Communities", Pharmacy Technology, 2004, pp. 28-39, vol. 20.
Petition for Inter Partes Review of U.S. Pat. No. 8,374,887, 2015.
Phillips, "Telepharmacy at Texas Tech", Apr. 2003 Presentation, Texas Tech University Health Sciences Center.
"Reference Manual for Computer Aided Therapy for Oncology", 2005, Cato Research, North Carolina, pp. 1-255.
Rouse et al., "White paper on pharmacy technicians 2002: Needed Changes can no longer wait", American Journal Health—System Pharmacy, 2003, pp. 37-51, vol. 60.
"Rural Hospital Joins the Big Leagues with the Power of a Kodak PAS/Enterprise Information Management (EIM) Solution", Kodak Medical Systems, 2005.

(56) References Cited

OTHER PUBLICATIONS

"Dictionary of Fine Chemicals" (edited by Editorial Board of the Japanese Fine Chemicals Dictionary, Chemical Industry Press, pp. 793-795, Jun. 1989).

* cited by examiner

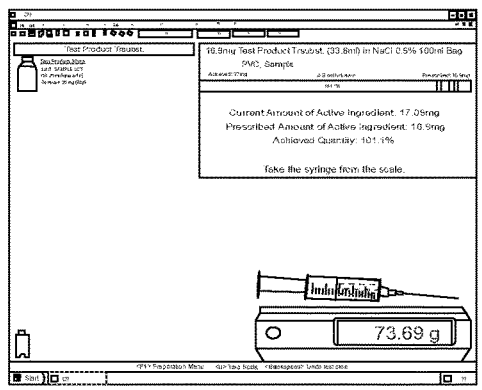
FIG. 10A
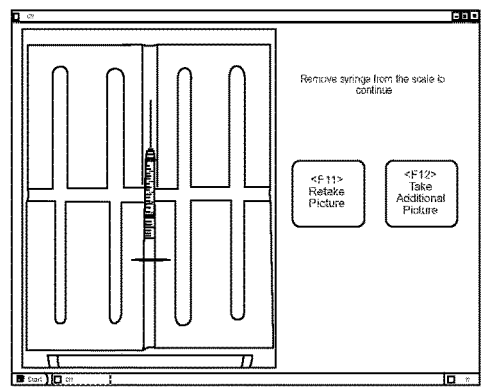
FIG. 10B
Scan IV bag
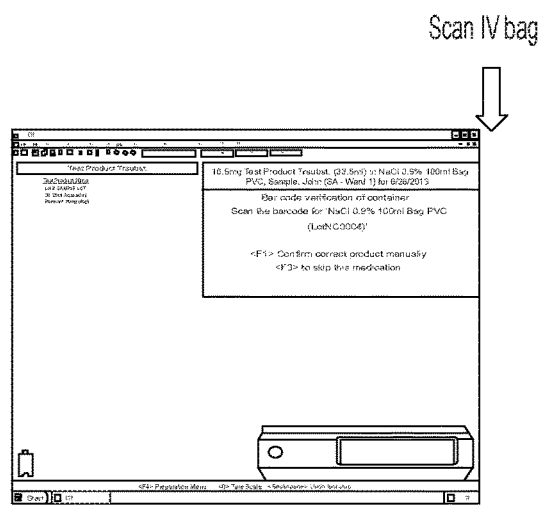
FIG. 10C
FORCE TAKE ADDITIONAL IMAGE CAPTURE
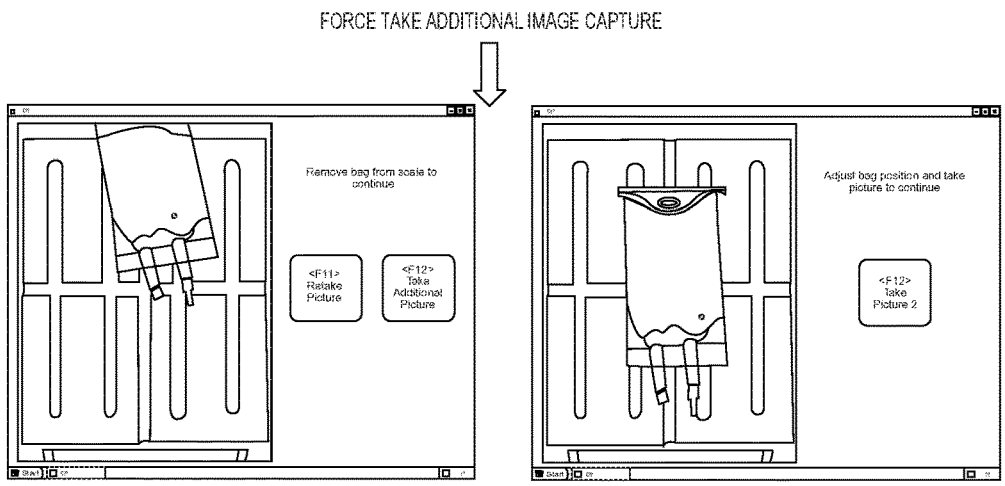
FIG. 11A
FIG. 11B

SYSTEM AND METHOD FOR PREPARING A PHARMACEUTICAL COMPOUND

CROSS REFERENCE TO RELATED APPLICATIONS

This application is a divisional of U.S. application Ser. No. 14/847,508, filed Sep. 8, 2015, which claims priority to U.S. Provisional Application Ser. No. 62/047,325, filed Sep. 8, 2014, entitled "Automated Visual Documentation Feature with Minimal User Input", U.S. Provisional Application Ser. No. 62/072,160, filed Oct. 29, 2014, entitled "Enhanced Pharmacist Review Module for a System for Preparing a Pharmaceutical Compound", U.S. Provisional Application Ser. No. 62/072,054, filed Oct. 29, 2014, entitled "Aerodynamically Streamlined Enclosure for Input Devices of a Medication Preparation System", U.S. Provisional Application Ser. No. 62/078,067, filed Nov. 11, 2014, entitled "Aerodynamically Streamlined Enclosure for Input Devices of a Medication Preparation System", and U.S. Provisional Application No. 62/077,968, filed Nov. 11, 2014, entitled "Enhanced Platen for Pharmaceutical Compounding", the entire disclosures of each of which are hereby incorporated by reference.

BACKGROUND OF THE INVENTION

Field of the Invention

The present disclosure is generally directed to systems and methods for preparing and administering a prescribed fluidic pharmaceutical compound, such as a chemotherapy compound and, more specifically, to systems and methods that allow a physician to enter a prescription for a patient that is subsequently verified for accuracy, prepared based on computer-aided instruction, verified based on a measured weight, substantially automatically provided with visual documentation, and administered to a patient.

Description of Related Art

Many technical functions involving the preparation and distribution of drugs may be performed in a pharmacy by a pharmacy technician or licensed nurse. When a non-pharmacist performs such functions, a pharmacist must generally verify their work. Various systems have been developed that take images of the various steps of the preparation of a pharmaceutical compound by a non-pharmacist technician to allow a pharmacist to later review the preparation. Such systems typically require the technician to take some type of active step in order to capture an image of the drug preparation step. For instance, the user may be required to use a touch screen or foot pedal to trigger image capture.

However, since such systems require an active step by the non-pharmacist technician to capture the appropriate image, errors may occur that prevent the supervising pharmacist from properly verifying the prescription. In addition, such prior art systems do not include any other mechanism for verifying the prescription and rely solely on the images obtained during the preparation of the prescription for verification.

In addition, systems have also been developed that utilize gravimetric information, checked by a methodology, to confirm the proper drug concentration. However, there is not a current system that combines information from an image verification system and a gravimetric verification system to ensure that a drug has been appropriately compounded.

Accordingly, a need exists for a system that triggers an image capturing step when certain criteria of the drug preparation have been met and moves to the next step of the drug preparation without any additional user input. A further need exists for a system that displays both image information and gravimetric measurements obtained during drug preparation steps to a reviewing pharmacist in a clear and easily readable manner, such that the pharmacist can quickly approve or reject a particular drug preparation.

SUMMARY OF THE INVENTION

According to one aspect of the invention, provided is a system for preparing a pharmaceutical compound. The system comprises: a computing device comprising a user interface providing an operator with instructions for preparing the pharmaceutical compound and at least one processor operatively connected to the user interface; a scale operatively connected to the at least one processor; and an image capture device operatively connected to the at least one processor and the scale and positioned to capture an image of at least one of a component used in preparing the pharmaceutical compound and the pharmaceutical compound. In one embodiment, the scale may be configured to transmit a signal to the at least one processor indicating that a weight detected thereby has changed when the at least one component is placed thereon and, based on the signal, the at least one processor triggers the image capture device to capture the image of the at least one component. Alternatively, the scale may be configured to transmit a signal to the at least one processor to verify that a correct amount of at least one component used in preparing the pharmaceutical compound has been drawn by the operator based on a weight of the at least one component and the at least one processor triggers the image capture device to capture the image of the at least one component when the at least one processor verifies the correct amount of the at least one component.

The image capture device may be triggered to capture the image of the at least one component once the weight of the at least one component on the scale has stabilized. The image of the at least one component may be displayed on the user interface for review by the operator. A removal of the at least one component from the scale may cause the at least one processor to accept the image, associate the image with a data record, and provide instruction on the user interface to allow the operator to move to a next step of the instructions for preparing the pharmaceutical compound. The data record and images may be provided to a pharmacist for verification. If the image is deemed to be unacceptable by the operator, the user interface may be configured to provide the operator with the capability to recapture the image.

An upper surface of the scale may be provided with a visual indication to the operator of a center of an image produced by the image capture device. The visual indication may be a cross recess formed in the upper surface of the scale. A scanner may be operatively coupled to the user interface. The scanner may be configured to scan a barcode provided on the at least one component and provide the user interface with information regarding the at least one component.

According to another aspect of the invention, provided is a system for preparing a pharmaceutical compound. The system comprises: a computing device comprising a user interface providing an operator with instructions for preparing the pharmaceutical compound and at least one processor operatively connected to the user interface; a scale operatively connected to the at least one processor; and an enclosure comprising an image capture device having a field of view positioned to capture an image of an object positioned on the scale during the preparation of the pharmaceutical compound. The image capture device is operatively connected to the at least one processor. The scale transmits a signal to the at least one processor to verify a correct amount of at least one component of the pharmaceutical compound based on a weight of the at least one component. The image capture device captures an image of the object positioned on the scale when the at least one processor verifies the correct amount of the at least one component.

The enclosure may be positioned above the scale, and may further comprise a barcode scanner. The barcode scanner may be angled with respect to the scale. The barcode scanner may include a sensor that is offset with respect to the scale. The enclosure may have a streamlined shape to minimize flow disturbance within a flow hood.

Another object of the system of the present disclosure is to allow a pharmacist to accurately review the steps taken by a technician preparing a prescribed fluidic pharmaceutical compound in which the system displays both image information and gravimetric measurements obtained during drug preparation steps to the pharmacist in a clear and easily readable manner, such that the pharmacist can quickly approve or reject a particular drug preparation. Overlaying two different information types (i.e., image and gravimetric information) gives the pharmacist valuable insights regarding the compounding procedure and the opportunity to better judge quality of preparations and technicians performing the preparations.

Such a system guides a pharmacist or technician through the different compounding steps to prepare a medication order in a pharmacy by giving step-by-step instructions on a computer screen and verifying the different compounding steps by measuring the weight of the compounded liquids with a scale. The measured weight is then analyzed with a mathematical methodology which checks if the necessary compounding accuracy has been accomplished. Every time an item is placed on the scale, a picture of the top of the scale is captured to create a visual documentation trail of the compounding process. The pictures are stored together with the recorded measurements from the scale and the methodology result in a log file. If a measured weight of a drug is not in the predefined tolerance range of the expected weight, the software generates instructions to change the amount of the drug to bring it within the acceptable tolerance range. The software will not proceed to the next compounding step as long as the required tolerance of the present step has not been accomplished.

In particular, the system includes a pharmacist review module where the pharmacist can review pictures of a particular drug preparation and either approve or disapprove the preparation for the release to the patient. The captured images are shown with the corresponding compounding instructions and an indication of whether the concentration of a drug is inside or outside of the acceptable tolerance range as determined by the mathematical methodology. Accordingly, the pharmacist review module provides visual information (i.e., the pictures of each step of the preparation) overlaid with quantitative measurements collected with the scale and verified by the mathematical methodology to adhere to predefined acceptance criteria.

More particularly, provided is a system for reviewing a verifying preparation of a pharmaceutical compound. The system comprises: a processor configured to receive information regarding the preparation of the pharmaceutical compound. The information comprises at least one image of at least one step of the preparation of the pharmaceutical compound and gravimetric measurement information provided by a scale during at least one step of the preparation of the pharmaceutical compound. The system also includes a user interface operatively connected to the processor and configured to display, based on instructions from the processor, the at least one image of the at least one step of the preparation of the pharmaceutical compound and an indication of whether a concentration of the pharmaceutical compound is within an acceptable tolerance range based on the gravimetric measurement information.

The at least one image of the at least one step of the preparation of the pharmaceutical compound may include an image of each step of the preparation of the pharmaceutical compound, and that the user interface includes an area that displays thumbnail images of each step. A graphical indication may be overlaid onto each of the thumbnail images to identify whether the concentration of the pharmaceutical compound is within the acceptable tolerance range for the step of the preparation of the pharmaceutical compound illustrated in each of the thumbnail images. The user interface may also include an area that displays the instructions for the preparation of the pharmaceutical compound that correspond to the at least one image of the at least one step of the preparation of the pharmaceutical compound that is displayed.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIGS. 5A-5D, 6A-6D, 7A-7B, 8A-8D, 9A-9D, 10A-10C, 11A-11D, 12A-12C, and 13A-13C are exemplary screen shots provided at a user interface of the system of FIG. 3 provided during the preparation of a pharmaceutical compound;

DESCRIPTION OF THE INVENTION

Figure 1:
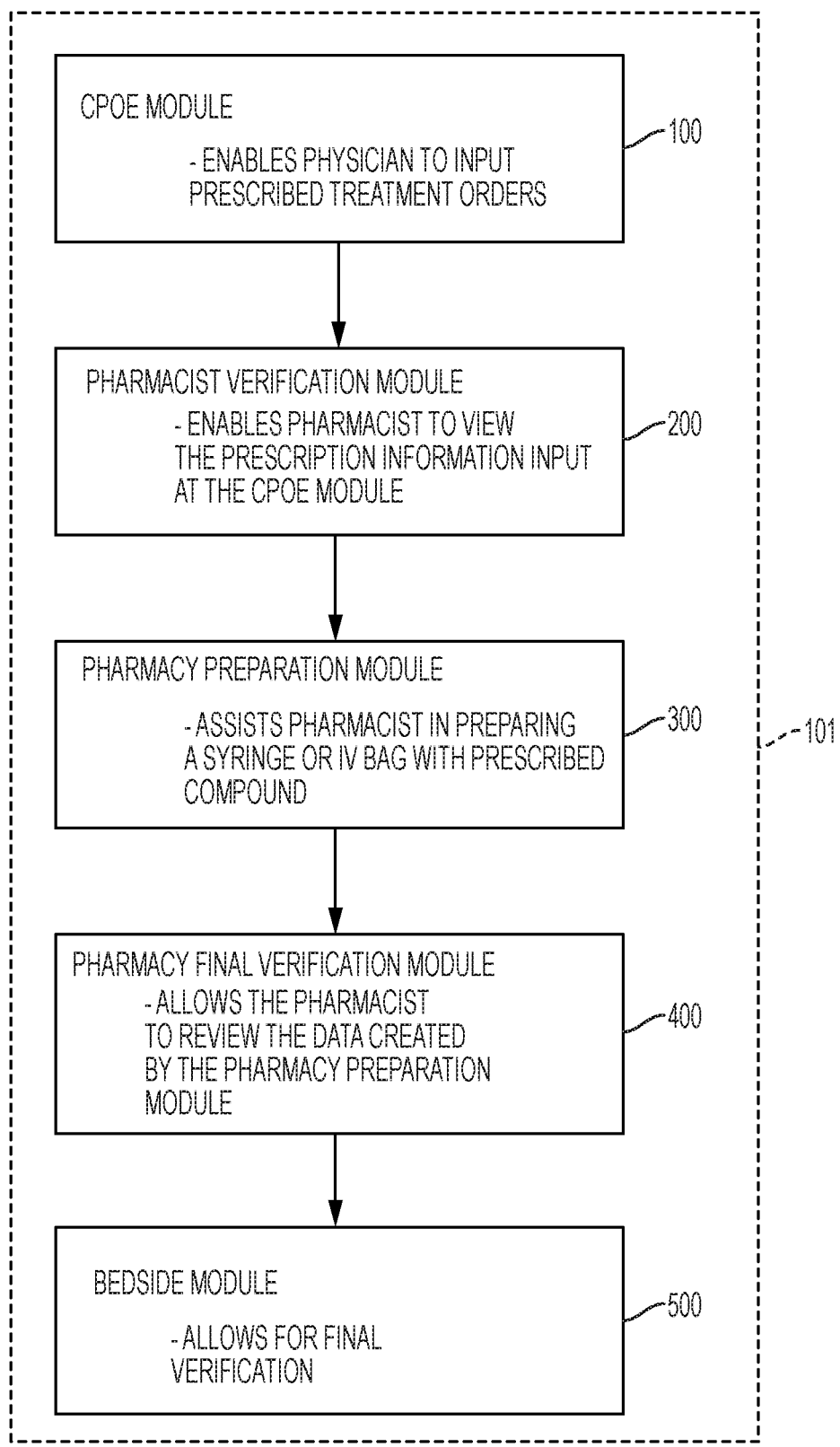
FIG. 1 is a flow chart of sequential computer-implemented modules for preparing and administering a prescribed fluidic pharmaceutical compound in accordance with the present disclosure.

For purposes of the description hereinafter, the terms "upper", "lower", "right", "left", "vertical", "horizontal", "top", "bottom", "lateral", "longitudinal", and derivatives thereof, shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

With reference to FIG. 1, the system of the present disclosure employs several sequential computer-implemented modules for preparing and administering a prescribed fluidic pharmaceutical compound, such as a chemotherapy compound. The modules each include code allowing for input from a user, generating output, and calculating and determining instructions for the preparation and administration of the pharmaceutical compound that may be implemented on one or more processor(s) 101 of one or more suitable computing device(s). More specifically, the system allows a physician to enter a prescription for a patient that is subsequently verified for accuracy, prepared based on computer-aided instruction, verified based on a measured weight, and administered to a patient. Such a system includes specific modules described in detail below. The modules include: (A) a computerized physician ordering entry (CPOE) module 100; (B) a pharmacist verification module 200; (C) a pharmacy preparation module 300; (D) a pharmacy final verification module 400; and (E) a bedside (e.g., administration) module 500. These modules may each be implemented on a single processor or multiple processors provided on a single computing device or may each be implemented on an independent computing device having its own processor where data and information is communicated between the computing devices using any suitable wired or wireless communication protocol, such as, but not limited to Ethernet, WiFi, cellular, Bluetooth, or the like.

A. CPOE Module

The CPOE module 100 enables physicians to input prescribed treatment orders for patients that include prescribed pharmaceuticals associated with particular patients. In particular, the physician enters prescription information for a patient into a computer, and the data is transmitted over an intra-hospital network and stored for retrieval and use by the subsequent modules described herein. The prescription information can include one or more pharmaceuticals and the corresponding dosage/quantities for those pharmaceuticals. The CPOE module 100 is an optional component and may not be utilized in every instance in which the overall system is implemented.

B. Pharmacist Verification Module

The pharmacist verification module 200 of the system enables pharmacists to view the prescription information data input by the physician in the CPOE module 100 or from some other source in circumstances when the CPOE module 100 is not utilized, and manually verify the prescribed treatment for a particular patient. As discussed above, the pharmacist verification module 200 may be implemented on the same computing device as the CPOE module 100. Alternatively, the pharmacist verification module 200 may be implemented on a computing device that is remote from the computing device that implements the CPOE module 100.

C. Pharmacy Preparation Module

Figure 2:
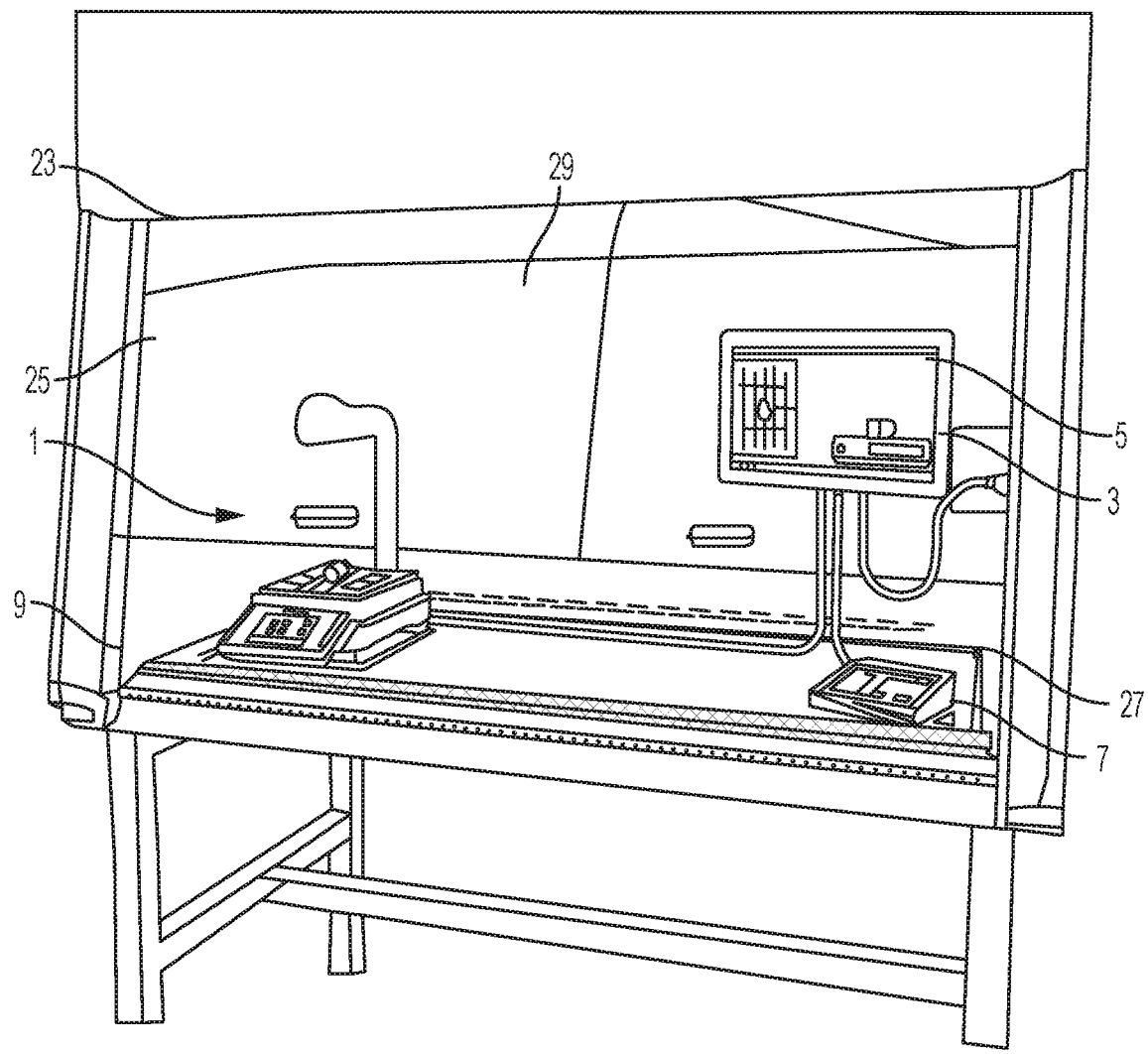
FIG. 2 is a perspective view of a scale and enclosure housing in a flow hood in accordance with an embodiment of the present disclosure.
Figure 3:
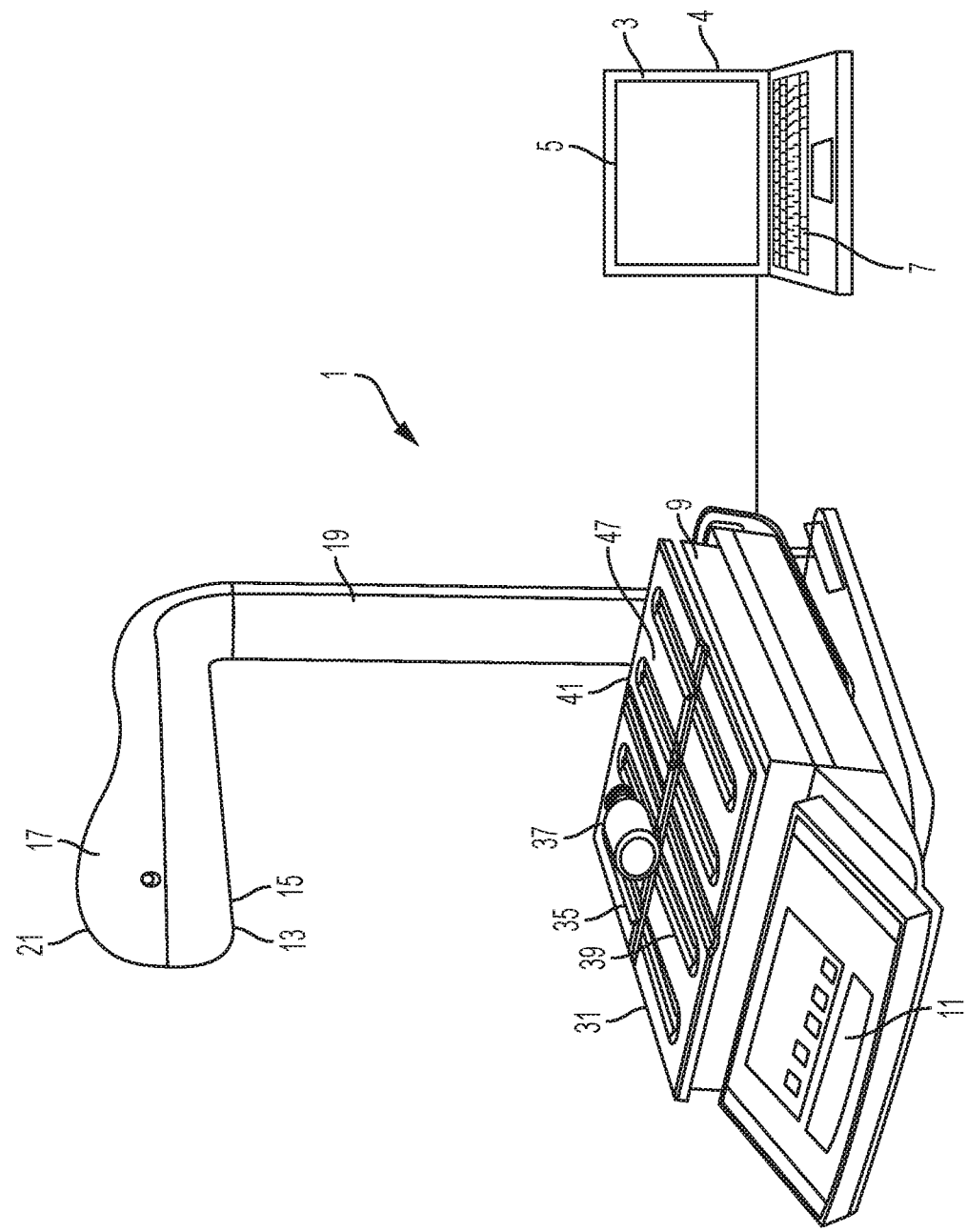
FIG. 3 is a perspective view of the scale and enclosure housing of FIG. 2 in accordance with an embodiment of the present disclosure.

With reference to FIGS. 2 and 3, the pharmacy preparation module 300 includes software and associated hardware, such as pharmacy preparation system 1, to guide a pharmacist or non-pharmacist technician through the steps of preparing a prescribed fluidic pharmaceutical compound, such as a chemotherapy compound. The pharmacy preparation system 1 assists pharmacists or non-pharmacist technicians in preparing a syringe or intravenous (IV) bag with one or more prescribed pharmaceutical compounds. The pharmacy preparation system 1 is operatively connected to a computing device 4 that includes a user interface 3 having a display 5 and a user input device 7, such as a keyboard, mouse, etc. Optionally, the display 5 of the user interface 3 may be implemented as a small LED projector provided on a portion of the pharmacy preparation system 1 for projecting the displayed information on a back wall of a laminar flow hood 25, thereby removing the need of a monitor for the display 5 as shown in FIG. 2. A scale 9 having a scale output interface 11 may be operatively connected to the user interface 3. The scale 9 may be implemented as any suitable device for detecting a change in mass or weight when an object is placed thereon. Accordingly, the scale 9 may simply be configured as a device that sends a signal when the mass or weight of an object is greater or less than a predetermined threshold or a high-precision scale that provides an accurate reading of the weight of an object placed thereon.

In one embodiment, a barcode scanner 13 may be operatively connected to at least one of the user interface 3 and the scale 9, such that the barcode scanner 13 may scan a medication vial having a barcode that is placed onto a portion of the scale 9. In another embodiment, an image capture device 15 may be operatively connected to at least one of the user interface 3 and the scale 9, such that the image capture device 15 may take a picture of an item, such as a medication vial, IV bag, or syringe placed onto a portion of the scale 9. In one embodiment, the image capture device 15 may capture a plurality of still images or running video of items placed onto a portion of the scale 9 throughout the medication compounding process for documentation and/or subsequent review of the medication compounding process.

In still another embodiment, at least one of the barcode scanner 13 and the image capture device 15 may be at least partially enclosed within an enclosure housing 17. In certain configurations, the housing 17 may fully enclose the barcode scanner 13 and the image capture device 15. Optionally, the housing 17 may include only one of the barcode scanner 13 and the image capture device 15.

The housing 17 may be positioned above a portion of the scale 9, such as supported by a supporting arm 19. As shown in FIG. 2, the pharmacy preparation system 1 may be positioned within a laminar flow hood 25 having an inlet air source 23 and an outlet air port 27 for creating a laminar flow of air within an interior 29 of the laminar flow hood 25. An exterior surface 21 of the housing 17 may have a streamlined shape and/or profile which is optimized to reduce disruption of the flow of air within the laminar flow hood 25.

This aerodynamically streamlined housing 17 as shown in FIG. 3 is designed in such a way to minimize the airflow disturbance that is created by having a device in a laminar airflow stream. This configuration allows the device to be placed in the upstream vicinity of a scale and still have an acceptable gravimetric accuracy (i.e. +/−0.05 g) and stabilization time (i.e. no more than 2 additional seconds) for verifying medication preparation purposes.

The smaller and/or more streamlined housing 17 results in a smaller flow disturbance and therefore a higher likelihood of meeting accuracy and stability requirements. The streamlined housing 17 has a form that minimizes flow disruption and drag, allowing for stable and accurate gravimetric readings that are required for medication preparation purposes. In addition, housing 17 allows for required gravimetric scale accuracy and stability, while placing the input devices (i.e., image capture device 15 and barcode scanner 13) in the upstream airflow vicinity relative to the scale 9. Placing these objects within the scale 9 vicinity is typically the ideal area for a number of reasons. A secondary advantage to the streamlined housing 17 is to provide and maintain a clean working environment for the sterile preparation of medications. In use, the purpose of the air stream in a flow hood is to create a clean zone for sanitary reasons. A turbulent zone created by objects near, or upstream of the airflow, may result in a potential contamination hazard during medication preparation. As a result, having an aerodynamically shaped housing for input devices minimizes the amount of laminar airflow disruption and decreases the chances of any type of contamination.

With continued reference to FIG. 3, the scale 9 may include a platen 31, such as a portion of the weighing surface of the scale 9, which may provide a visual indication, such as a cross recess 35, to the technician of a center of an image to be captured by the image capture device 15. This allows a technician to properly position drug compounding related medications 37 and related supplies within the field of view of the image capture device 15, such as the image capture device enclosed within the housing 17 positioned above the platen 31 of the scale 9. An upper surface 41 of the platen 31 may define a plurality of recessed grooves 39 and/or protrusions extending from a surface of the platen 31 to frictionally restrain drug compounding related medications 37 and related supplies on the upper surface 41 of the platen 31. In another configuration, the upper surface 41 of the platen 31 may include a tackifier or other frictionally enhancing surface to similarly restrain drug compounding related medications 37 and related supplies on the upper surface 41 of the platen 31. The arrangement of grooves 39 and/or protrusions may easily indicate to a user the center of the platen 31 which may be arranged to coincide with the center of the field of view of the image capture device 15.

The plurality of recessed grooves 39 and/or protrusions extending from a surface of the platen 31 may be configured to restrain any liquid material that is accidentally spilled on the upper surface 41 of the platen 31 during a drug compounding procedure. The plurality of recessed grooves 39 may define a receiving well 47 which serves to collect and restrain accidentally spilled material in a confined area within the platen 31 until proper disposal techniques may be employed. The surface of the platen 31 may be coated with a durable composition that resists degradation caused by exposure to caustic agents, such as chemotherapy compounds and drugs, as well as cleaning agents, such as bleach, isopropyl alcohol, and the like. In certain configurations, the durable composition may be an epoxy or epoxy-based paint or coating.

Figure 4:
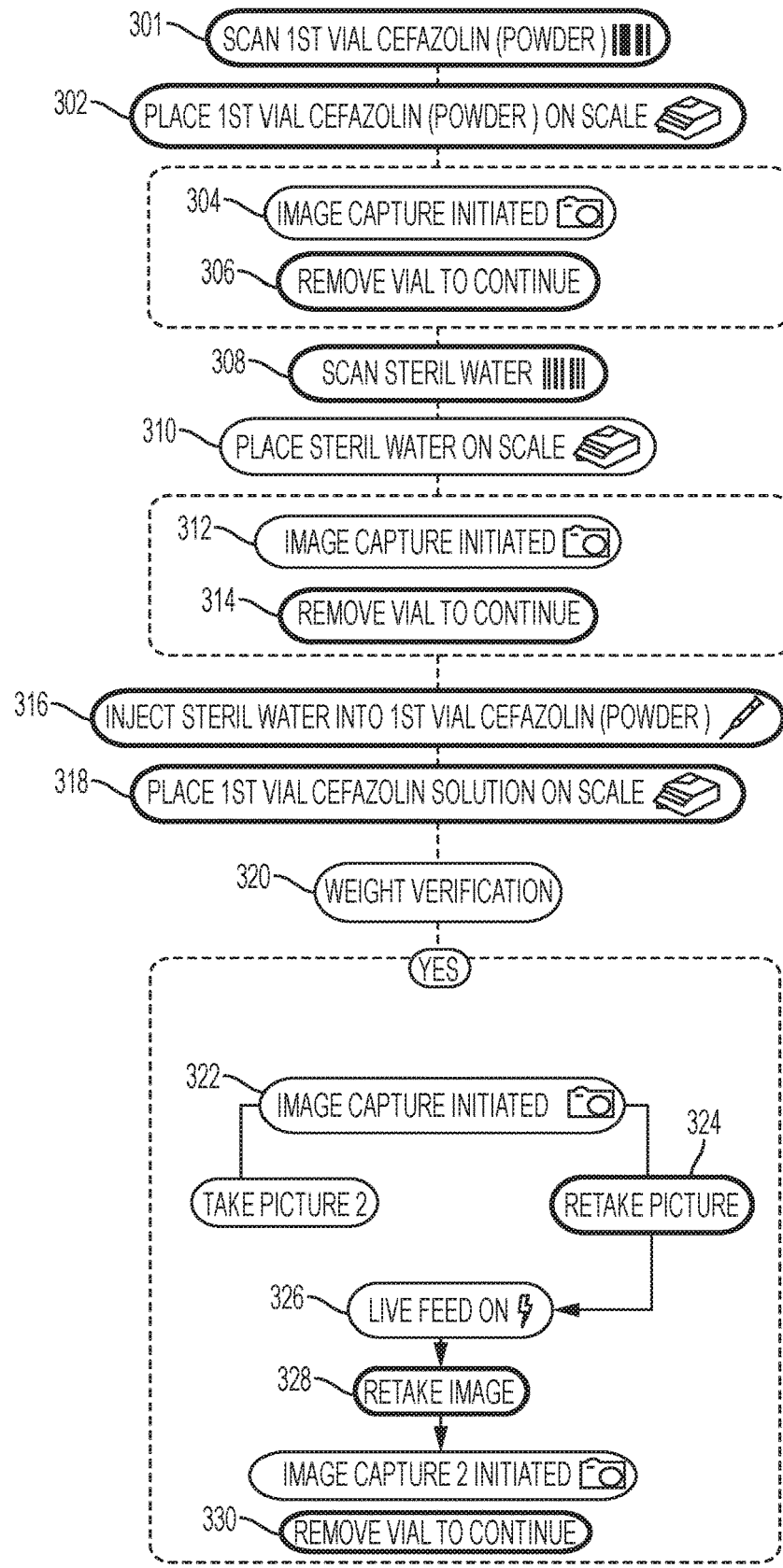
FIG. 4 is a flow chart describing the manner in which a pharmaceutical compound is prepared in accordance with an embodiment of the present disclosure.
Figure 5A:
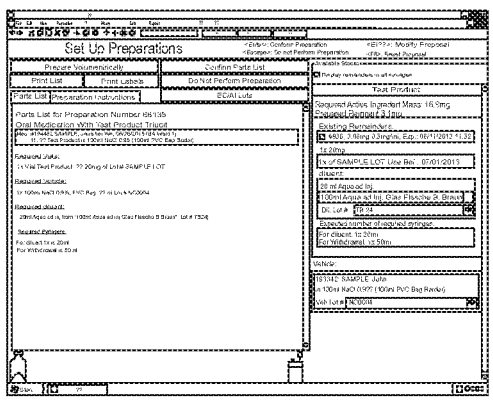
Figure 5B:
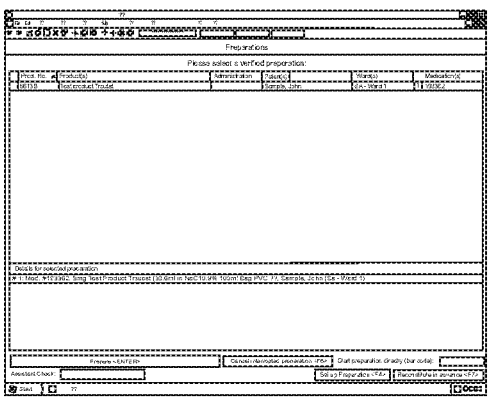
Figures 5C, 5D:
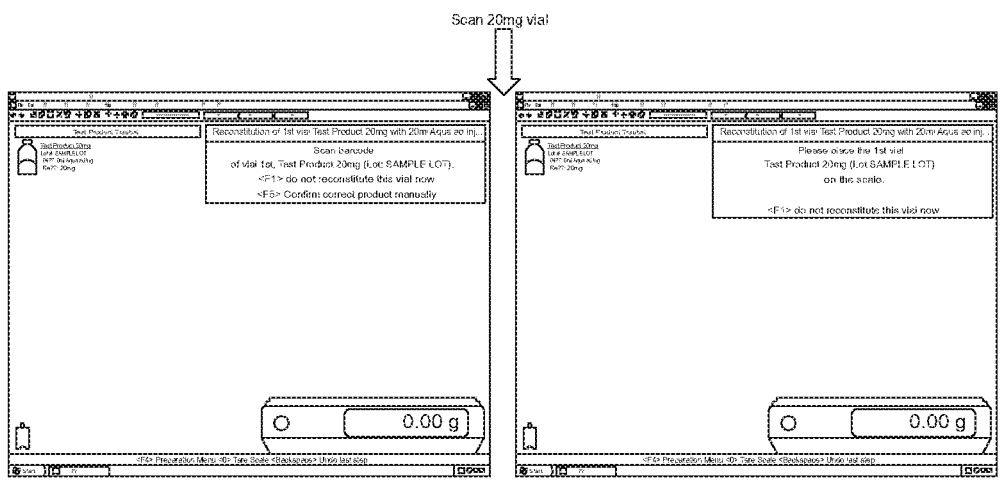
Figures 6A, 6B:
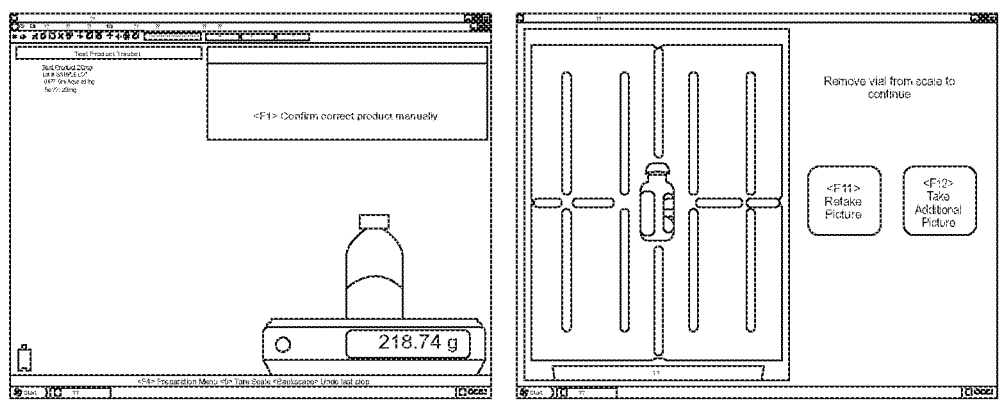
Figure 14A:
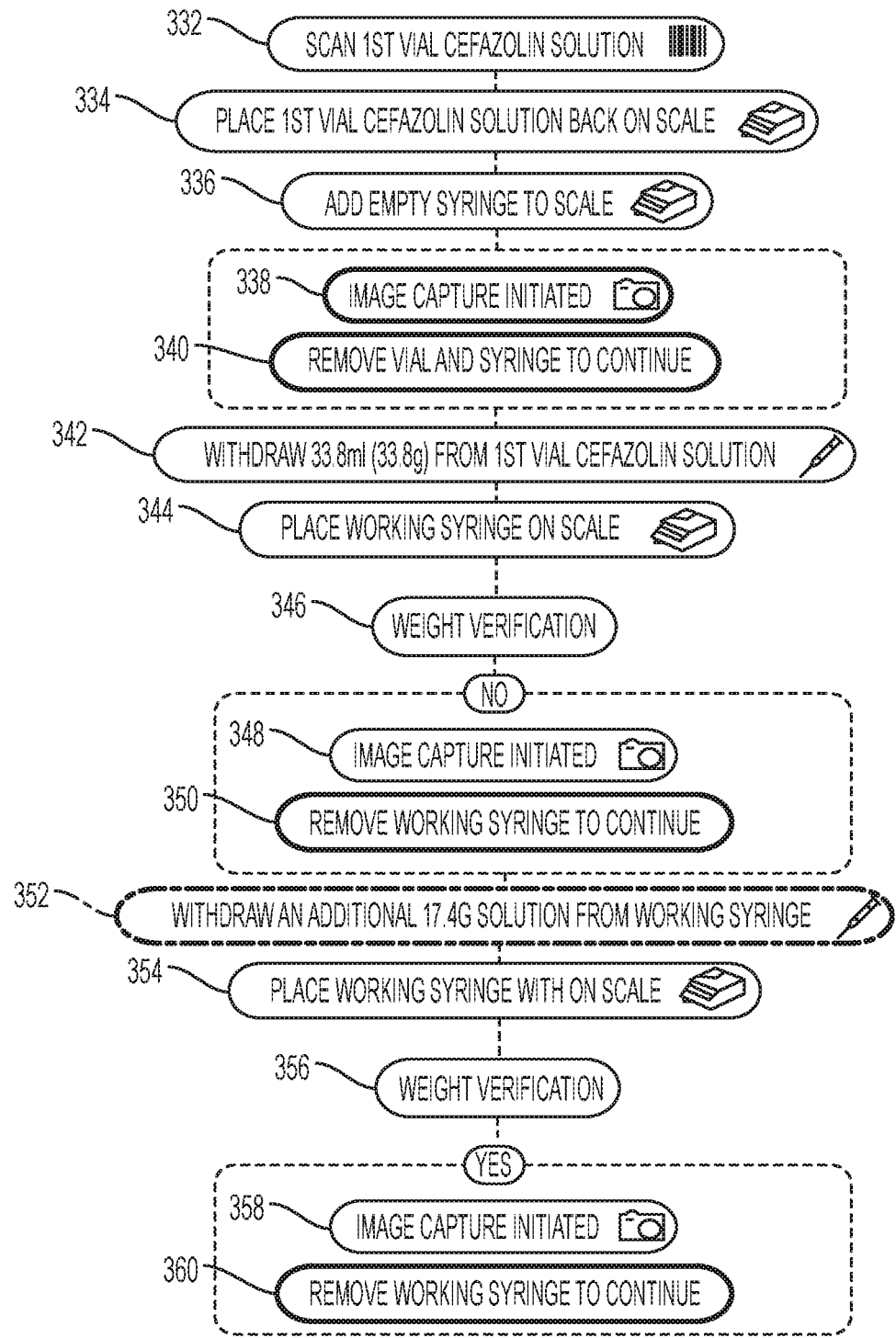
FIG. 14A is a flow chart describing the manner in which a pharmaceutical compound is prepared in accordance with another embodiment of the present disclosure.
Figure 14B:
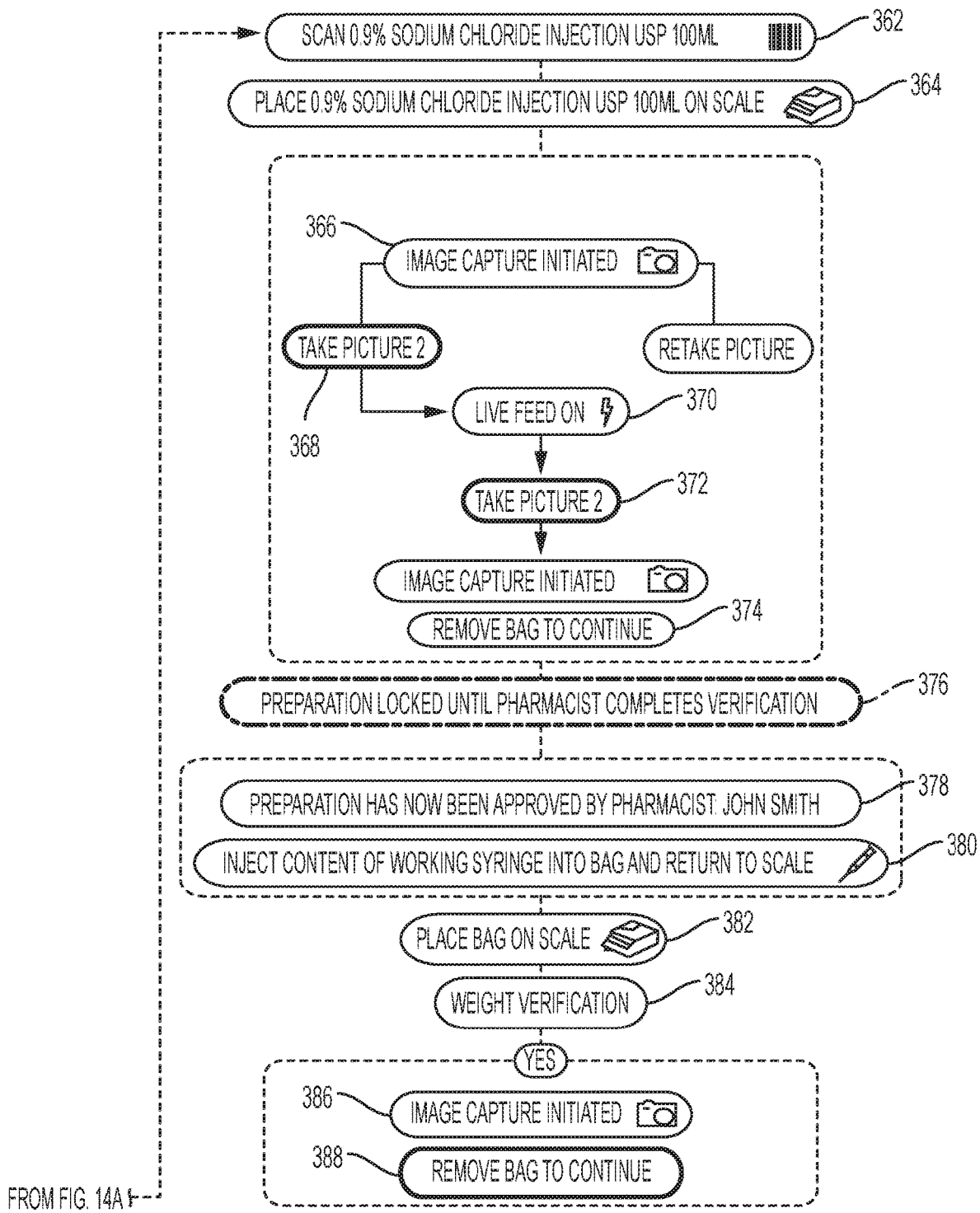
FIG. 14B is a flow chart describing the manner in which a pharmaceutical compound is prepared, which continues from FIG. 14A, in accordance with an embodiment of the present disclosure.

With reference to FIGS. 4, 14A, and 14B, in operation, the pharmacist/technician is prompted through a series of display screens provided on the display 5 of the user interface 3 as shown in one or more of FIGS. 5A-5D, 6A-6D, 7A-7B, 8A-8D, 9A-9D, 10A-10C, 11A-11D, 12A-12C, and 13A-13C to take the following steps to prepare the pharmaceutical compound. FIG. 4 provides a flow chart of a first phase of the preparation in which an active ingredient is reconstituted. First, the operator scans a first barcode with the barcode scanner 13 on a medication container including a drug to be reconstituted to prepare the prescribed pharmaceutical compound (block 301) as shown in FIG. 5C. Then, the medication container is placed on the scale 9 (block 302). A representation of this step is displayed on display 5 of user interface 3 as shown in FIG. 6A. Once the weight stabilizes, the system verifies that the measured weight is meeting the weight target plus/minus a predetermined tolerance. In addition, the image capture device 15 takes an image of the medication container and displays it to the user on the display 5 of the user interface 3 (block 304) as shown in FIG. 6B. The user then removes the medication container and the image is saved to the data record of the drug preparation (block 306).

Figures 6C, 6D:
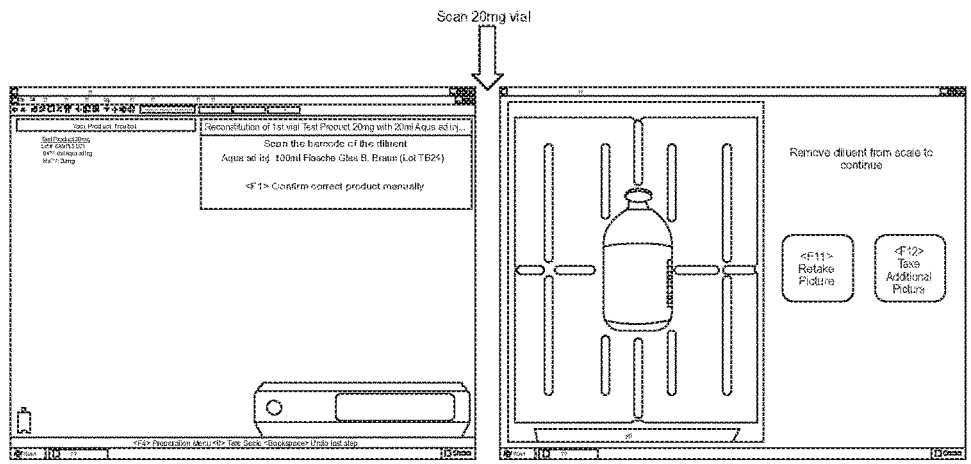

Next, the technician scans a second barcode of a fluid container of fluid that is to be mixed with the drug to be reconstituted (block 308) as shown in FIG. 6C. The fluid container is then placed on the scale 9 (block 310) and, once the weight stabilizes, the image capture device 15 takes an image of the fluid container and displays it to the user on the display 5 of the user interface 3 (block 312) as shown in FIG. 6D. The user then removes the fluid container and the image is saved to the data record of the drug preparation (block 314).

Figures 7A, 7B:
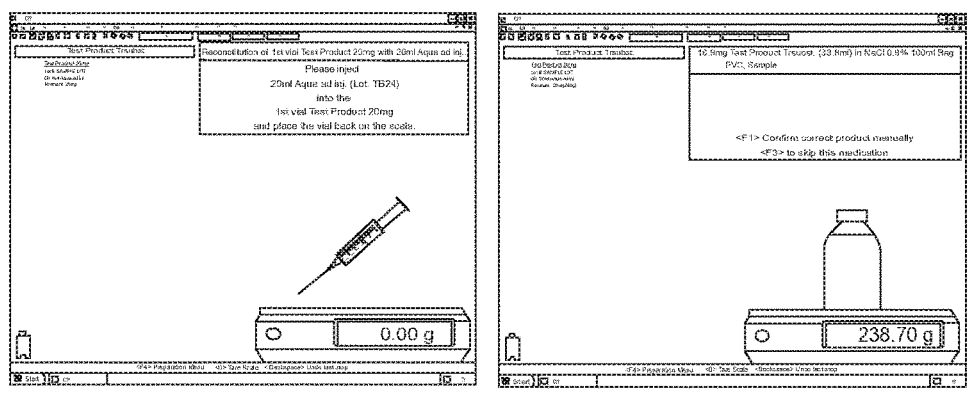

Thereafter, the user mixes the drug to be reconstituted with the fluid in the fluid container by injecting the fluid from the fluid container into the medication container (block 316) as shown in FIG. 7A. The medication container is then returned to the scale 9 and the weight of the medication container is verified (block 318) as shown in FIG. 7B. Once the weight is stabilized and verified (block 320), the image capture device 15 automatically takes an image of the medication container based on a signal received from the scale and displays the image on the display 5 of the user interface 3 (block 322). If the technician decides the image was not meeting certain requirements, there is the option to request a new or additional image (block 324). Requesting another picture will automatically switch the image capture device 15 into a "live video mode" displayed at the user interface 3 (block 326). The technician can now move the medication container on the scale 9 to a preferred position and trigger the image capture through the user interface 3 (block 328). As before, the captured image will be shown at the user interface 3 and by removing the item from the scale 9, the technician accepts the image and the system automatically moves to the next compounding step (block 330).

Once the drug preparation is complete, the system prints a barcode label for placement on the reconstituted drug preparation.

Figures 8A, 8B:
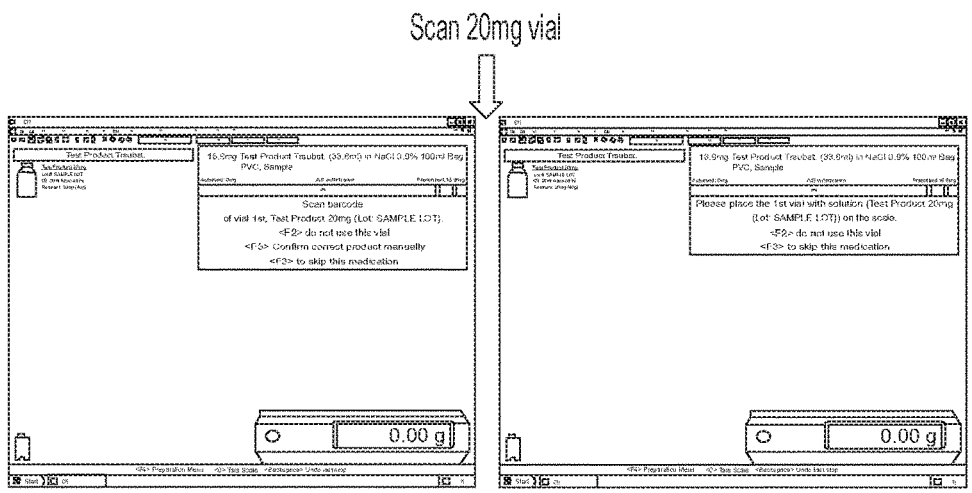
Figure 8C:
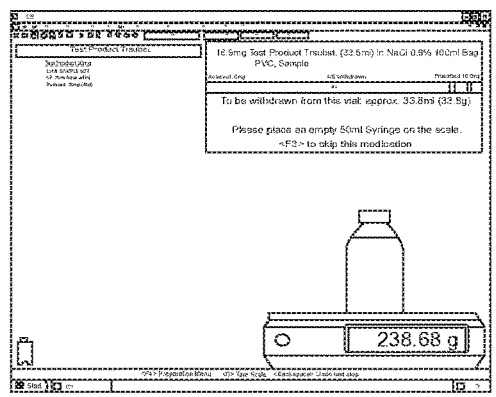
Figure 8D:
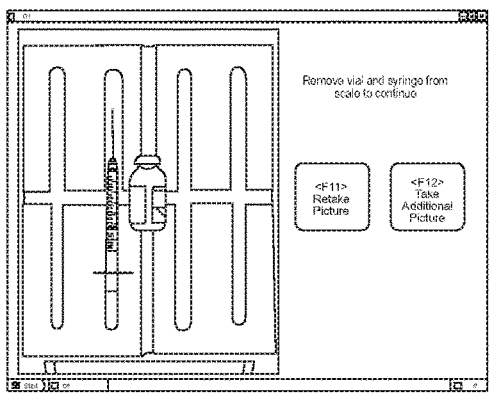

With reference to FIGS. 14A and 14B, a second phase of the preparation of the pharmaceutical compound using the pharmacy preparation module 300 will be described. First, the operator scans a barcode with the barcode scanner 13 on the reconstituted drug preparation (block 332) as shown in FIG. 8A. Then, the reconstituted drug preparation is placed on the scale 9 (block 334) and an empty syringe is added to the scale 9 (block 336) as shown in FIG. 8C. Once the weight stabilizes, the system verifies that the measured weight is meeting the weight target plus/minus a predetermined tolerance. In addition, the image capture device 15 takes an image of the medication container and displays it to the user on the display 5 of the user interface 3 (block 338) as shown in FIG. 8D. The user then removes the reconstituted drug preparation and the empty syringe and the image is saved to the data record of the drug preparation (block 340).

Figure 9A:
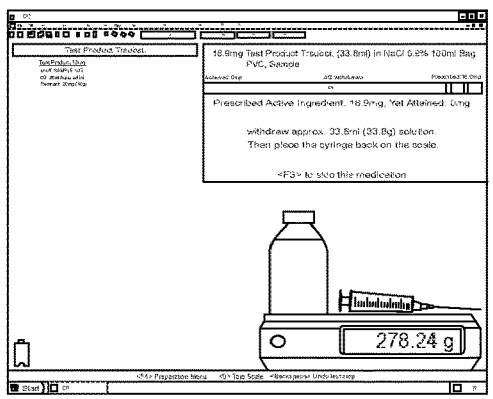
Figure 9B:
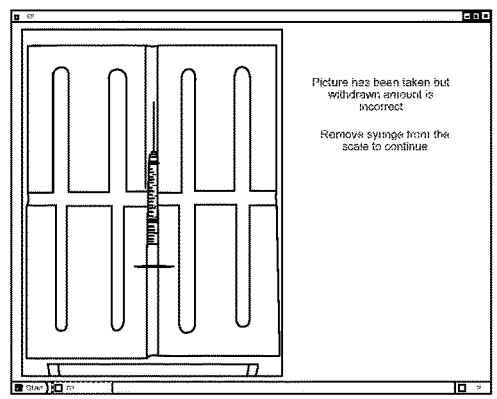
Figure 9C:
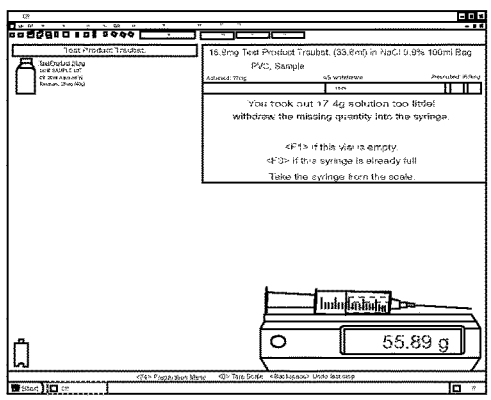
Figure 9D:
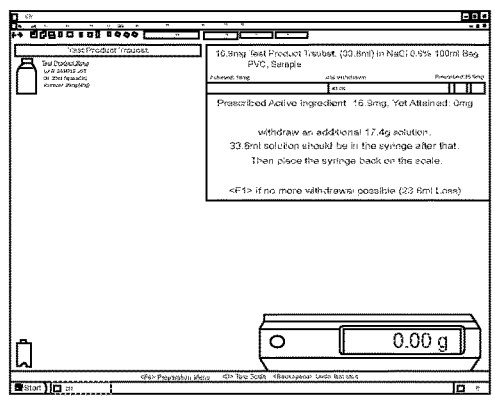

Next, the technician is instructed to withdraw a predetermined amount from the reconstituted drug preparation with the syringe (block 342) as shown in FIG. 9A and places the syringe back on the scale 9 (block 344). The weight is then verified (block 346) and an image is captured (block 348) as shown in FIG. 9B. If the weight is determined to be too low as shown in the flow chart of FIGS. 14A and 14B, the technician is instructed to remove the syringe (block 350 and FIG. 9C) and withdraw an additional amount of the reconstituted drug preparation (block 352 and FIG. 9D).

Once the additional amount of the reconstituted drug preparation is withdrawn into the syringe, the syringe is placed back on the scale 9 (block 354) as shown in FIG. 10A. The weight is then verified (block 356) and an image is captured (block 358) as shown in FIG. 10B. The syringe is then removed from the scale (block 360).

Figure 11C:
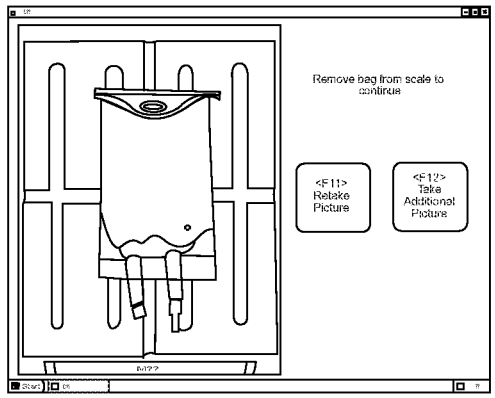
Figure 11D:
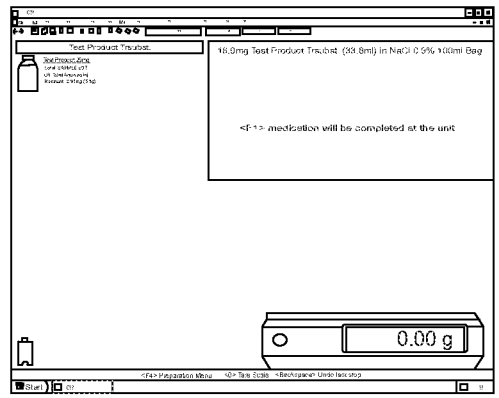

The technician then scans a barcode of a fluid container having a saline solution therein, such as an IV bag (block 362). The fluid container is then placed on the scale 9 (block 364) and, once the weight stabilizes, the image capture device 15 takes an image of the fluid container and displays it to the user on the display 5 of the user interface 3 (block 366). If the technician decides the image was not meeting certain requirements, there is the option to request a new or additional image (block 368). Requesting another picture will automatically switch the camera into a "live video mode" displayed at the user interface 3 (block 370). The technician can now move the medication container on the scale 9 to a preferred position and trigger the image capture through the user interface 3 (block 372). As before, the captured image will be shown at the user interface 3 and by removing the item from the scale 9, the technician accepts the image (block 374) and the system automatically awaits authorization from a pharmacist to precede (block 376). The screen shots in FIGS. 11A-11C illustrate this procedure.

Figure 12A:
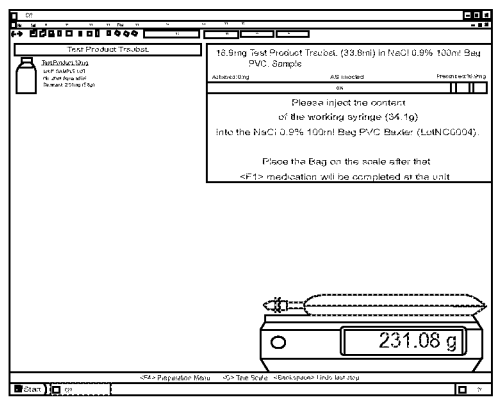
Figure 12B:
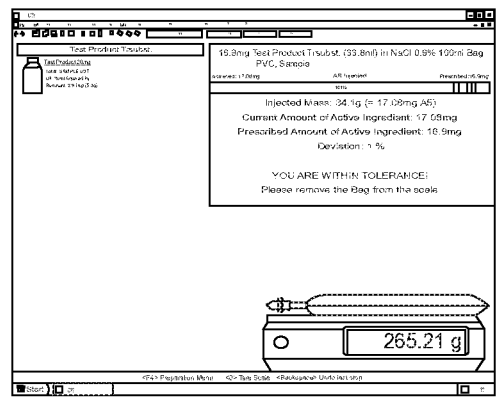
Figure 12C:
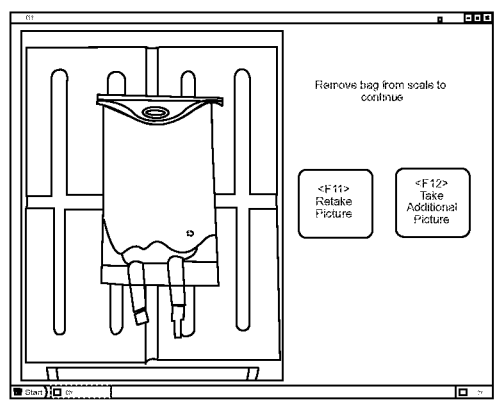
Figures 13A, 13B, 13C:
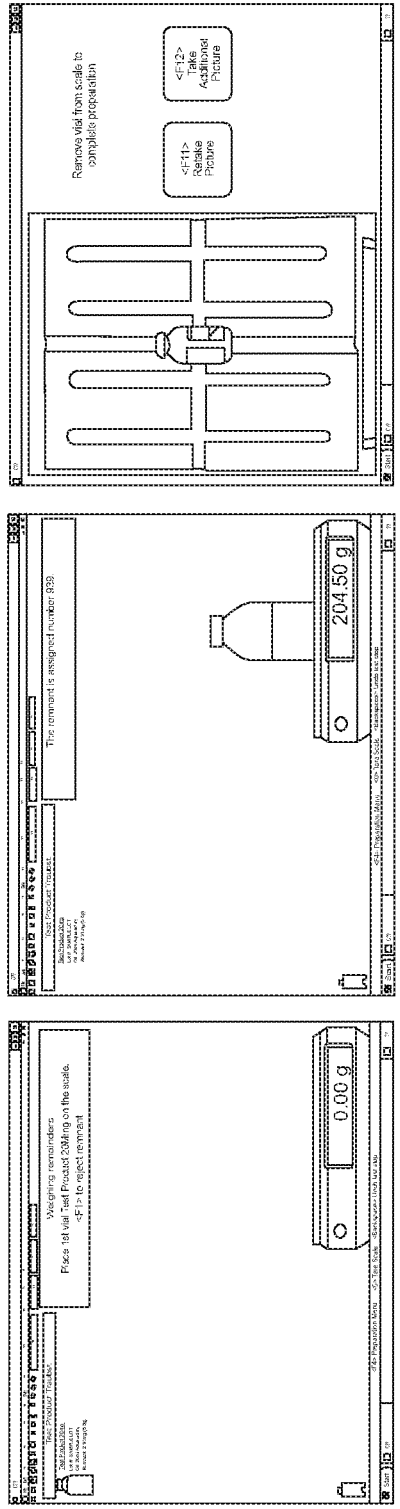

Once pharmacist authorization has been provided (block 378), the user injects the contents of the syringe into the fluid container (block 380) as shown in FIG. 12A. The medication container is then returned to the scale 9 and the weight of the medication container is verified (block 382). Once the weight is stabilized and verified (block 384) as shown in FIG. 12B, the image capture device 15 automatically takes an image of the medication container based on a signal received from the scale and displays the image on the display 5 of the user interface 3 (block 386) as shown in FIG. 12C. As before, the captured image will be shown at the user interface 3 and by removing the item from the scale 9, the technician accepts the image (block 388). Once the drug preparation is complete, the system prints a barcode label for placement on the completed drug preparation that includes encoded information representing the name of the pharmaceutical and patient information.

The pharmacy preparation module 300 also includes software instructions that cause the processor of the computing device 4 to perform the following actions during the drug preparation: (i) retrieve the prescription information data input by the physician in the CPOE module 100 from the intra-hospital network; (ii) verify that the scanned barcode corresponds with the prescription information; (iii) determine if the weight of the syringe and/or IV bag is within a predetermined threshold accuracy level for the amount of the pharmaceutical to be administered; (iv) determine what adjustments must be made if the weight is not accurate; and (v) transmit data relating to the weight of the syringe and/or IV bag back to the intra-hospital network.

D. Pharmacy Final Verification Module

Figure 15:
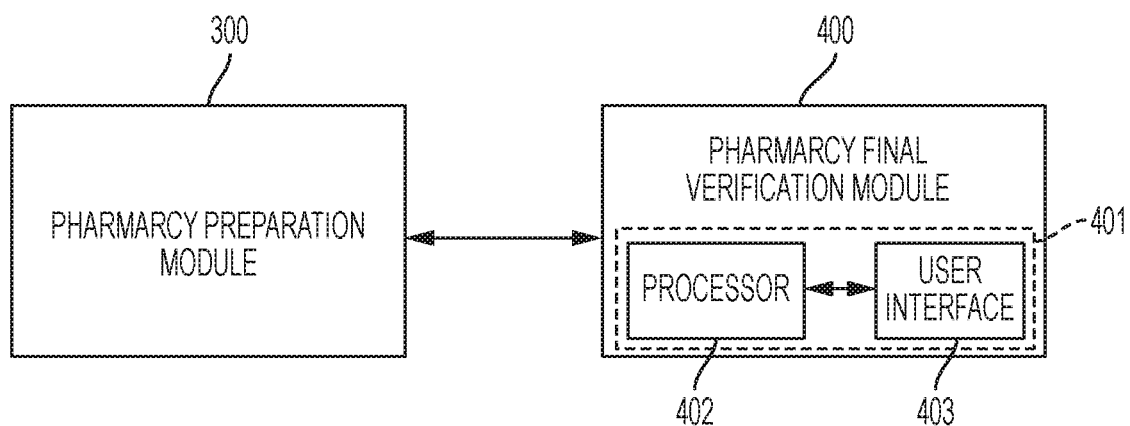
FIG. 15 is a schematic diagram of a pharmacy final verification module in accordance with an embodiment of the present disclosure.

Subsequent to preparing the prescribed pharmaceutical, the pharmacy final verification module 400 allows the pharmacist to review the data and/or documentation created by the pharmacy preparation module 300 including the images taken by the image capture device 15 and either approve or disapprove the preparation for the release to the patient. As described hereinabove, the pharmacist final verification module 400 may be implemented on the same computing device as the pharmacy preparation module 300. Alternatively, the pharmacist final verification module 400 may be implemented on a computing device that is remote from the computing device of the pharmacy preparation module 300. Such a remote configuration is illustrated schematically in FIG. 15. With reference to FIG. 15, the pharmacist final verification module 400 includes a system 401 having a processor 402 configured to receive information from the pharmacy preparation module 300 regarding the preparation of the pharmaceutical compound. The information comprises at least one image of at least one step of the preparation of the pharmaceutical compound and gravimetric measurement information provided by the scale 9 during at least one step of the preparation of the pharmaceutical compound. The system 401 also includes a user interface 403 operatively connected to the processor 402 and configured to display, based on instructions from the processor 402, the at least one image of the at least one step of the preparation of the pharmaceutical compound and an indication of whether a concentration of the pharmaceutical compound is within an acceptable tolerance range based on the gravimetric measurement information.

Figure 16:
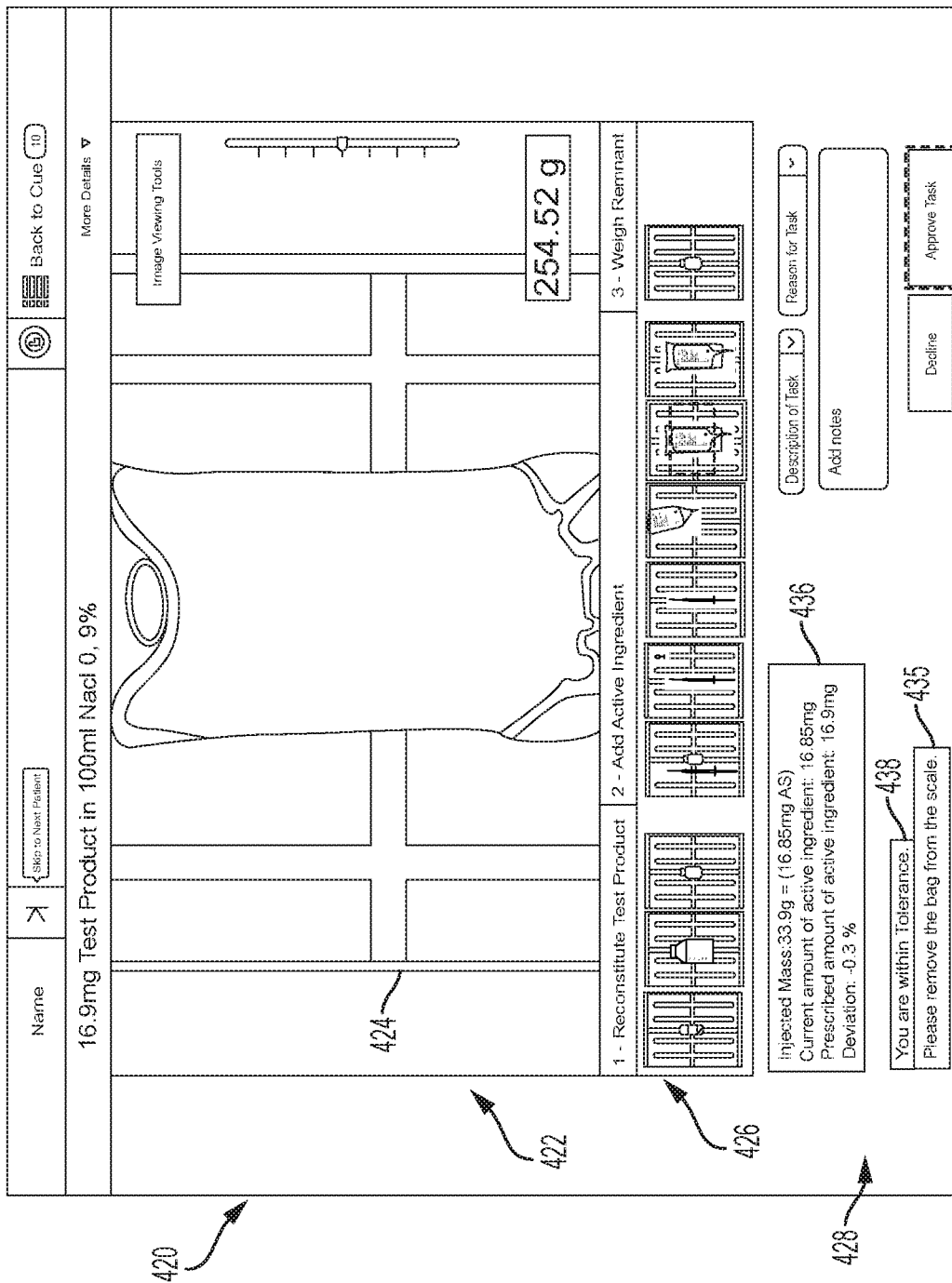
FIG. 16 is an exemplary screen shot provided at the pharmacy final verification module allowing a pharmacist to review the preparation of the pharmaceutical compound in accordance with the present disclosure.

An exemplary screen shot provided at the pharmacy final verification module 400 is provided in FIG. 16. On this exemplary screen, the captured images are shown with the corresponding compounding instructions and an indication of whether the concentration of a drug is inside or outside of the acceptable tolerance range as determined by the mathematical methodology. Accordingly, the pharmacy final verification module 400 provides visual information (i.e., the pictures of each step of the preparation) overlaid with quantitative measurements collected with the scale and verified by the mathematical methodology to adhere to predefined acceptance criteria.

Figure 17:
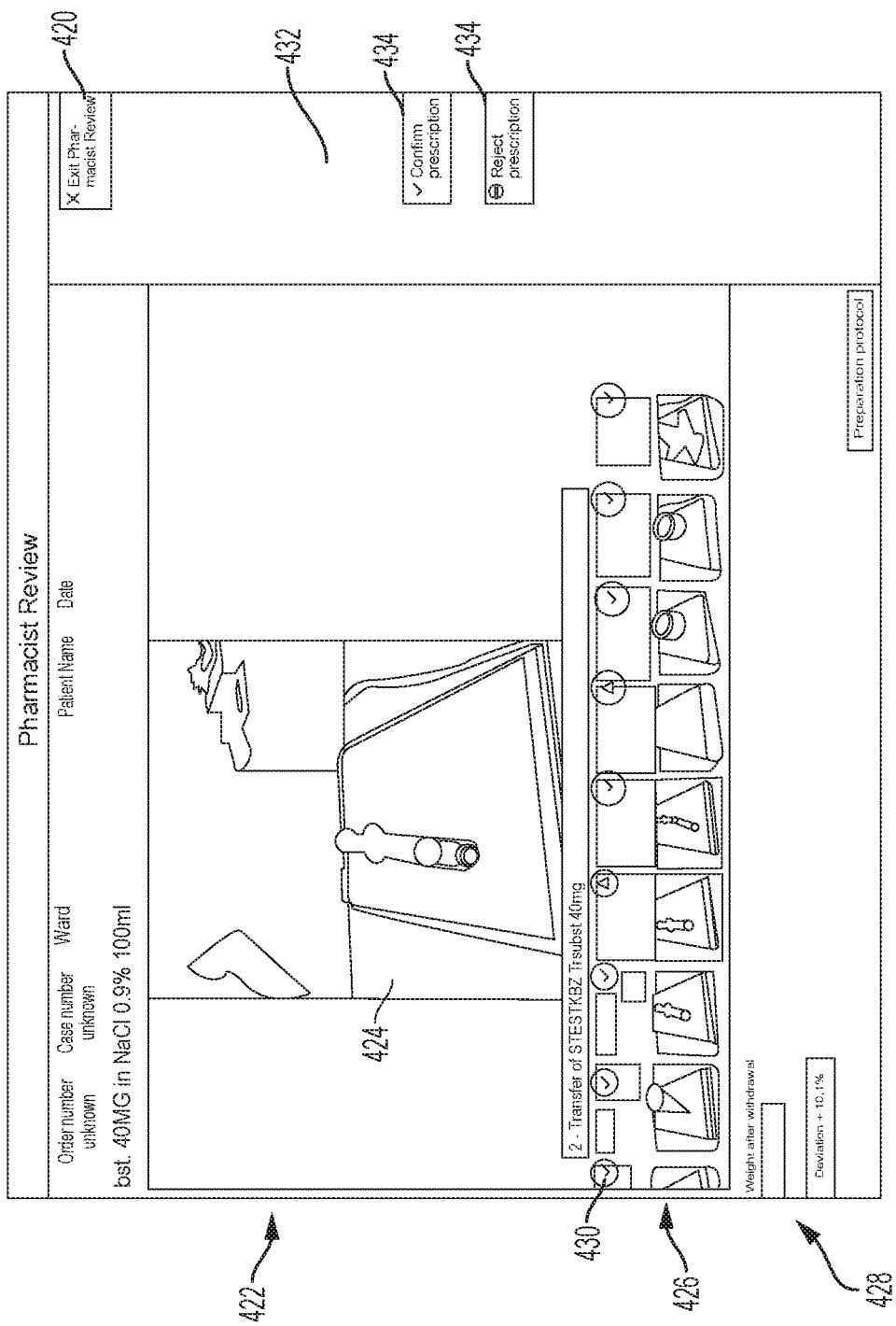
FIG. 17 is another exemplary screen shot provided at the pharmacy final verification module in accordance with the present disclosure.

As illustrated in FIGS. 16 and 17, the pharmacy final verification module 400 includes a review window 420 having a first portion 422 that displays a selected image 424 of a particular drug preparation step, a second portion 426 that displays thumbnail images of each of the drug preparation steps, and a third portion 428 that displays the compounding instructions for the particular drug preparation step along with the result of the quantitative measurement provided by the scale, and an indication provided by the mathematical methodology that the concentration of a drug is either inside or outside of the acceptable tolerance. In addition, an icon 430 may be associated with the thumbnail of the particular drug preparation step to provide an indication to the pharmacist that the tolerance requirements of the particular drug preparation step were met. For instance, a green check mark may be provided if the tolerance requirements were met or a red exclamation point may be provided if the tolerance requirements were not met. The review window 420 may also include a fourth portion 432 that displays icons 434 allowing the pharmacist to either confirm or reject the drug preparation.

With continued reference to FIGS. 16 and 17, the mouse pointer was hovering over the fifth thumbnail from the left in the second portion 426 of the review window 420. For this particular thumbnail, the enlarged picture is shown above the thumbnail row in the first portion 422 of the review window 420 and below the thumbnails, the corresponding compounding instructions 435 along with the result of the quantitative measurement 436 and methodology check 438 (see also the exemplary screenshot provided in FIG. 2) are shown in the third portion 428 of the review window 420. The third portion 428 may also include other statistical information regarding the drug preparation such as, but not limited to, how often compounding steps had to be repeated to meet tolerance targets or if particular compounding steps took more time than usual compared to other cases.

Additionally, the icon 430 in the thumbnail indicates if the tolerance requirements of the particular compounding step were met, giving the pharmacist a quick guidance to where in the compounding procedure problems occurred. A gray box (not shown) around multiple thumbnails provides an indication to the pharmacist that the image representing this compounding step was retaken.

The overlay of a captured image with verification information generated by a mathematical methodology from gravimetric data allows the pharmacist to quickly review very different types of information. The visual information content of the image allows the pharmacist to check very apparent information such as, but not limited to, the drug color, the syringe type, or whether the system was used improperly (e.g., the user used an additional object to generate the necessary weight to pass the tolerance requirements of the methodology). The icon 430 in the thumbnail representing the methodology check outcome is binary information telling the pharmacist that the amount of drug was either inside or outside of the tolerance requirements for the particular compounding step. An accumulation of icons 430 on thumbnails in the form of red exclamation marks provides a quick indication to the pharmacist that the technician needed several iterations to meet tolerance requirements and may trigger additional scrutiny when reviewing such a drug preparation.

E. Bedside Module

Prior to administering the prescribed pharmaceutical to a patient, the bedside module 500 allows for a final verification. A barcode scanner located proximate to a patient is used by a nurse or other technician to scan the barcode label on the syringe and/or IV bag. The barcode scanner is in communication with a computer, which verifies the information encoded on the second barcode with patient information and/or prescription information retrieved from the intra-hospital network.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

The invention claimed is:

1. A system for preparing a pharmaceutical compound comprising:
   a first computing device comprising a user interface providing an operator with instructions for preparing the pharmaceutical compound and at least one processor operatively connected to the user interface;
   a scale operatively connected to the at least one processor; and
   an image capture device operatively connected to the at least one processor and the scale and having a field of view positioned to capture an image of at least one component used in preparing the pharmaceutical compound and the pharmaceutical compound positioned on the scale,
   wherein the image capture device is triggered to capture the image of the at least one component once the weight of the at least one component or the pharmaceutical compound on the scale has stabilized and the weight of the at least one component or the pharmaceutical compound on the scale has been verified by the at least one processor,
   wherein the image of the at least one component is displayed on the user interface for review by the operator, and
   wherein the image of the at least one component is transmitted to a pharmacist workstation for verification.

2. The system of claim 1, wherein a removal of the at least one component from the scale causes the at least one processor to accept the image, associate the image with a data record, and provide instruction on the user interface to allow the operator to move to a next step of the instructions for preparing the pharmaceutical compound.

3. The system of claim 2, wherein the data record is transmitted to a pharmacist workstation for verification.

4. The system of claim 1, wherein, if the image is deemed to be unacceptable by the operator, the user interface is configured to provide the operator with the capability to recapture the image.

5. The system of claim 1, further comprising a scanner operatively coupled to the user interface.

6. The system of claim 5, wherein the scanner is configured to scan a barcode provided on the at least one component and provide the at least one processor with information regarding the at least one component.

7. A system for preparing a pharmaceutical compound, comprising:
   a computing device comprising a user interface providing an operator with instructions for preparing the pharmaceutical compound and at least one processor operatively connected to the user interface;
   a scale operatively connected to the at least one processor; and
   an enclosure comprising an image capture device having a field of view positioned to capture an image of an object positioned on the scale during the preparation of the pharmaceutical compound, the image capture device operatively connected to the at least one processor,
   wherein the scale transmits a signal to the at least one processor to verify a correct amount of at least one component of the pharmaceutical compound based on a weight of the at least one component, wherein the image capture device captures an image of the object positioned on the scale when the at least one processor verifies the correct amount of the at least one component, and wherein the image of the object is displayed on the user interface for review by the operator.

8. The system of claim 7, wherein the enclosure is positioned above the scale.

9. The system of claim 7, wherein the enclosure further comprises a barcode scanner.

10. The system of claim 9, wherein the barcode scanner is angled with respect to the scale.

11. The system of claim 9, wherein the barcode scanner has a sensor that is offset with respect to the scale.

12. The system of claim 7, wherein the enclosure has a streamlined shape to minimize flow disturbance within a flow hood.

13. A system for preparing a pharmaceutical compound comprising:
 a computing device comprising a user interface providing an operator with instructions for preparing the pharmaceutical compound and at least one processor operatively connected to the user interface;
 a scale operatively connected to the at least one processor; and
 an image capture device operatively connected to the at least one processor and the scale and positioned to capture at least one image of at least one of a component used in preparing the pharmaceutical compound and the pharmaceutical compound,
 wherein the scale transmits at least one signal to the at least one processor indicating that a weight detected thereby has changed and to verify a correct amount of the at least one component based on a weight of the at least one component when the at least one component is placed thereon and, based on the at least one signal, the at least one processor triggers the image capture device to capture the at least one image of the at least one component, and
 wherein the at least one image of the at least one component is displayed on the user interface for review by the operator.

14. The system of claim 13, wherein a removal of the at least one component from the scale causes the at least one processor to accept the image, associate the image with a data record, and provide instruction on the user interface to allow the operator to move to a next step of the instructions for preparing the pharmaceutical compound.

15. The system of claim 14, wherein the data record and images are transmitted to a pharmacist workstation for verification.

16. The system of claim 13 wherein, if the image is deemed to be unacceptable by the operator, the user interface is configured to provide the operator with the capability to recapture the image.

17. The system of claim 13, wherein the image is saved to a database when the weight of the at least one component or the pharmaceutical compound on the scale has been verified by the at least one processor.

18. The system of claim 17, wherein the scanner is configured to scan a barcode provided on the at least one component and provide the at least one processor with information regarding the at least one component.

19. The system of claim 1, further comprising an enclosure positioned above a portion of the scale, wherein the image capture device is enclosed within the enclosure.

20. The system of claim 19, wherein the enclosure has a streamlined shape to minimize flow disturbance within a flow hood.

21. The system of claim 1, wherein the scale comprises a platen including a visual identifier for identifying a portion of the field of view of the image capture device.

22. The system of claim 21, wherein the visual identifier is a plurality of recessed grooves in an upper surface of the platen and/or protrusions extending from the upper surface of the platen.

* * * * *